US012574081B2

(12) United States Patent     (10) Patent No.:    US 12,574,081 B2

Zhang et al.             (45) Date of Patent:     Mar. 10, 2026

(54) SYSTEMS AND METHODS OF JOINT CONSTELLATION AND PRECODING FOR MIMO COMMUNICATIONS

(71) Applicant: Villanova University, Villanova, PA (US)

(72) Inventors: Xinliang Zhang, Bryn Mawr, PA (US); Mojtaba Vaezi, Wayne, PA (US)

(73) Assignee: Villanova University

( * ) Notice: Subject to any disclaimer, the term of this patent is extended or adjusted under 35 U.S.C. 154(b) by 17 days.

(21) Appl. No.: 18/583,187

(22) Filed: Feb. 21, 2024

(65) Prior Publication Data

US 2024/0283500 A1      Aug. 22, 2024

Related U.S. Application Data

(60) Provisional application No. 63/486,153, filed on Feb. 21, 2023.

(51) Int. Cl.
| | |
|---|---|
| *H04B 7/0456* | (2017.01) |
| *H04B 7/08* | (2006.01) |

(52) U.S. Cl.
CPC ......... *H04B 7/0456* (2013.01); *H04B 7/0848* (2013.01)

(58) Field of Classification Search
CPC .. H04B 7/0456; H04B 7/0452; H04B 7/0848; H04B 7/0851; H04B 7/0854; H04B 7/0857; H04B 7/046; H04B 7/0473; H04B 7/0478; H04B 7/0482
See application file for complete search history.

(56) References Cited

U.S. PATENT DOCUMENTS

| | | | | |
|---|---|---|---|---|
| 2016/0366003 | A1* | 12/2016 | Kwon | H04W 72/0473 |
| 2019/0044571 | A1* | 2/2019 | Taherzadeh Boroujeni | |
| | | | | H04L 65/40 |
| 2021/0021308 | A1* | 1/2021 | Kimura | H04L 27/00 |

OTHER PUBLICATIONS

Agrell, et al., "Gray Coding for Multilevel Constellations in Gaussian Noise", IEEE Transactions on Information Theory, vol. 53, No. 1, Jan. 2007, 224-235.

(Continued)

*Primary Examiner* — Khanh C Tran
(74) *Attorney, Agent, or Firm* — Duane Morris LLP

(57) ABSTRACT

The disclosed exemplary embodiments are directed to wireless communication apparatus and methods that, among other advantages, improve bit error rates. In some examples, a multi-input multi-output (MIMO) transmitter receives data for transmission. The transmitter applies a joint constellation and precoding process to the received data to generate corresponding transmit symbols. The joint constellation and precoding process encodes the symbols jointly, using a codebook that maps sequences of bits to symbols. Further, the transmitter applies a Mahalanobis distance process to the transmit symbols to separate the transmit symbols, and generates a transmission signal based on the separated transmit symbols. The transmitter transmits the transmission signal to each of multiple antennae for wireless transmission. In some examples, a receiver receives the transmitted symbols from the plurality of antennae, and applies a corresponding decoding process to the received symbols to generate the data.

20 Claims, 17 Drawing Sheets

(56) References Cited

OTHER PUBLICATIONS

Choi, et al., "Spatial Lattice Modulation for MIMO Systems", IEEE Transactions on Signal Processing, vol. 66, No. 12, Jun. 15, 2018, 3185-3198.

Dörner, et al., "Deep Learning Based Communication Over the Air", IEEE Journal of Selected Topics in Signal Processing, vol. 12, No. 1, Feb. 2018, 132-143.

O'Shea et al., "An Introduction to Deep Learning for the Physical Layer" IEEE Transactions on Cognitive Communications and Networking, vol. 3, No. 4, Dec. 2017, 563-575.

O'Shea, et al., "Deep Learning-Based MIMO Communications", arXiv preprint, arXiv: 1707.07980v1, Jul. 25, 2017, 1-9.

Song, et al., "Benchmarking and Interpreting End-to-End Learning of MIMO and Multi-User Communication", IEEE Transactions on Wireless Communications, vol. 21, No. 9, Sep. 2022, 7287-7298.

Song, et al., "Benchmarking End-to-end Learning of MIMO Physical-Layer Communication", 2020 IEEE Global Communications Conference, Dec. 7, 2020-Dec. 11, 2020, Taipei, Taiwan, 6 pages.

Ye, et al., "Deep Learning-Based End-to-End Wireless Communication Systems With Conditional GANs as Unknown Channels", IEEE Transactions on Wireless Communications, vol. 19, No. 5, May 2020, 3133-3143.

Zhang, et al., "SVD-Embedded Deep Autoencoder for MIMO Communications", ICC 2022—IEEE International Conference on Communications, May 16-20, 2022, Seoul, Korea, 6 pages.

* cited by examiner

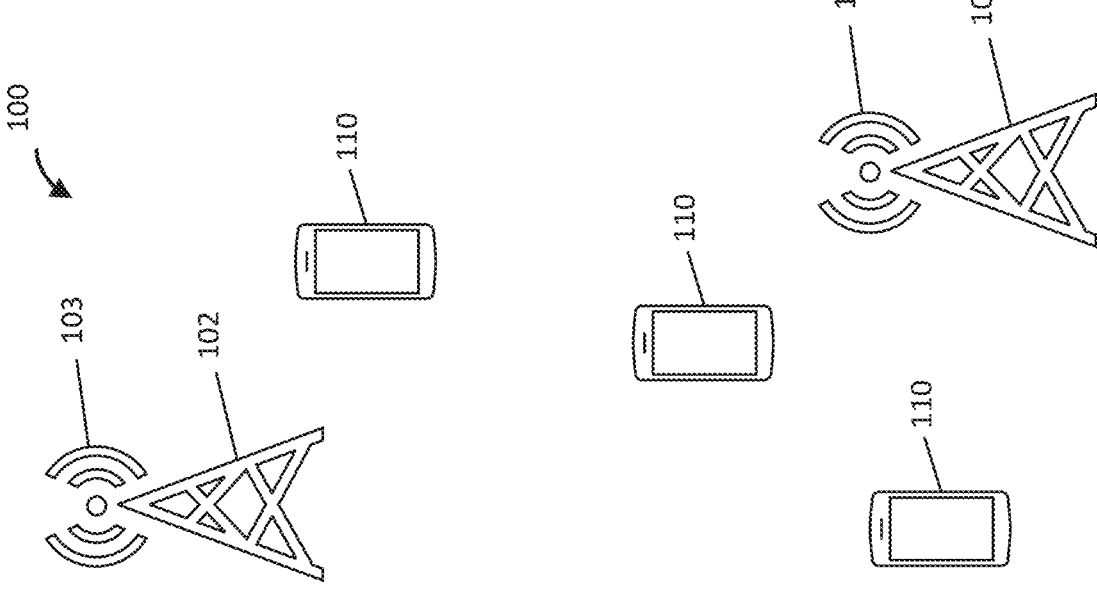
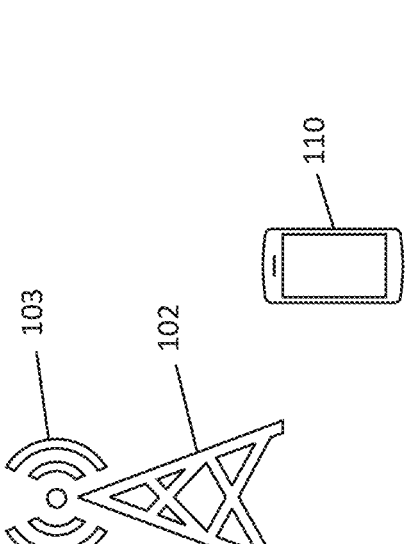
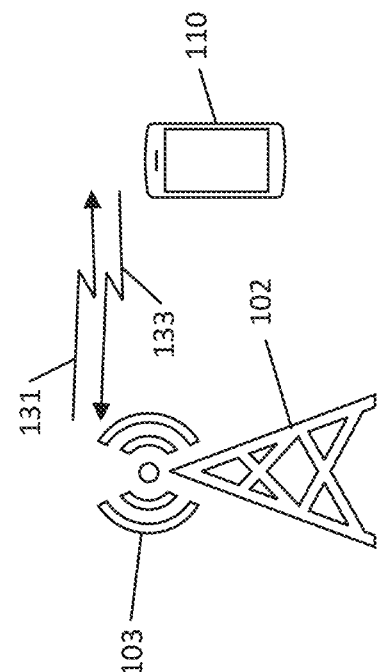
FIG. 1

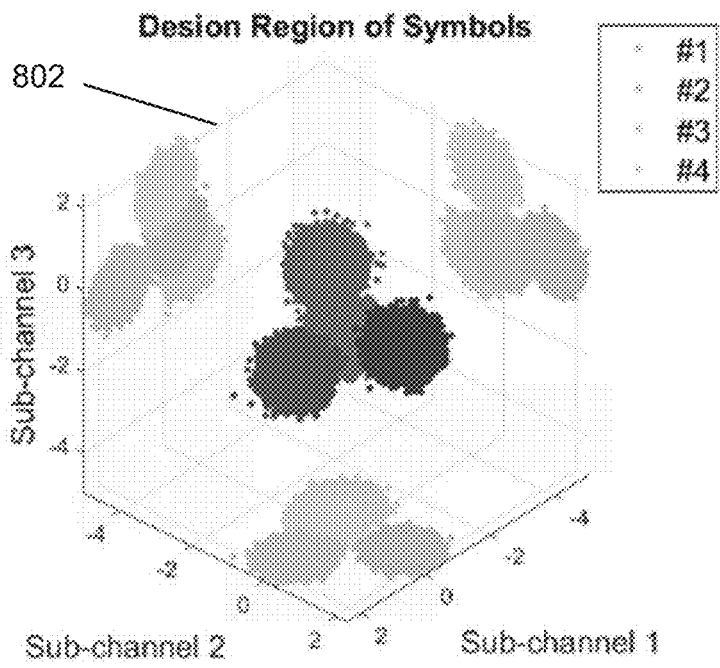
(a) Channel with equal singular values
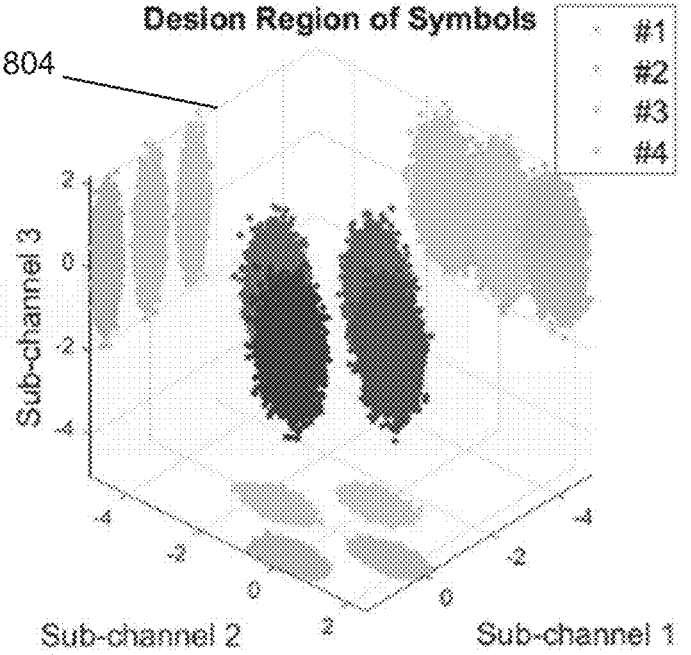
(b) Channel with non-equal singular values
FIG. 8

(a) Sub-channel 1, $M = 4$ (b) Sub-channel 2, $M = 4$ (a) Sub-channel 1, $M = 8$ (b) Sub-channel 2, $M = 8$ (a) Using channel in (26a), $M$=8

(b) Using channel in (26a), $M$=16

(c) Using channel in (26b), $M$=8

(d) Using channel in (26b), $M$=16

(e) Using channel in (26c), $M$=8

(f) Using channel in (26c), $M$=16

(a) Using channel in (28a), $M=8$     (b) Using channel in (28a), $M=16$ (c) Using channel in (28b), $M=8$     (d) Using channel in (28b), $M=16$ (e) Using channel in (28c), $M=8$     (f) Using channel in (28c), $M=16$ $$\lambda_6 = [2.60, \quad 0.87]^T, \tag{12}$$

$$\lambda_7 = [3.22, \quad 1.80, \quad 0.96]^T, \tag{13}$$

$$\lambda_8 = [5.60, \quad 2.46, \quad 2.23, \quad 0.29]^T. \tag{14}$$

1402
1404
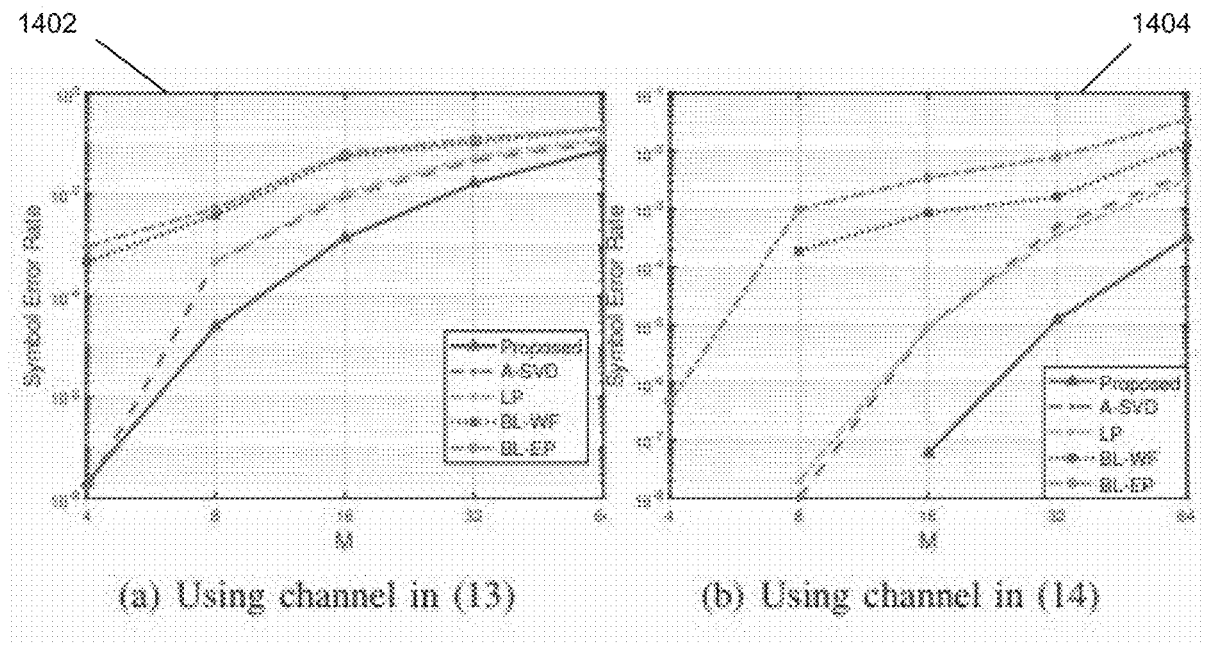
(a) Using channel in (13)
(b) Using channel in (14)
FIG. 14A                    FIG. 14B

1502

1504

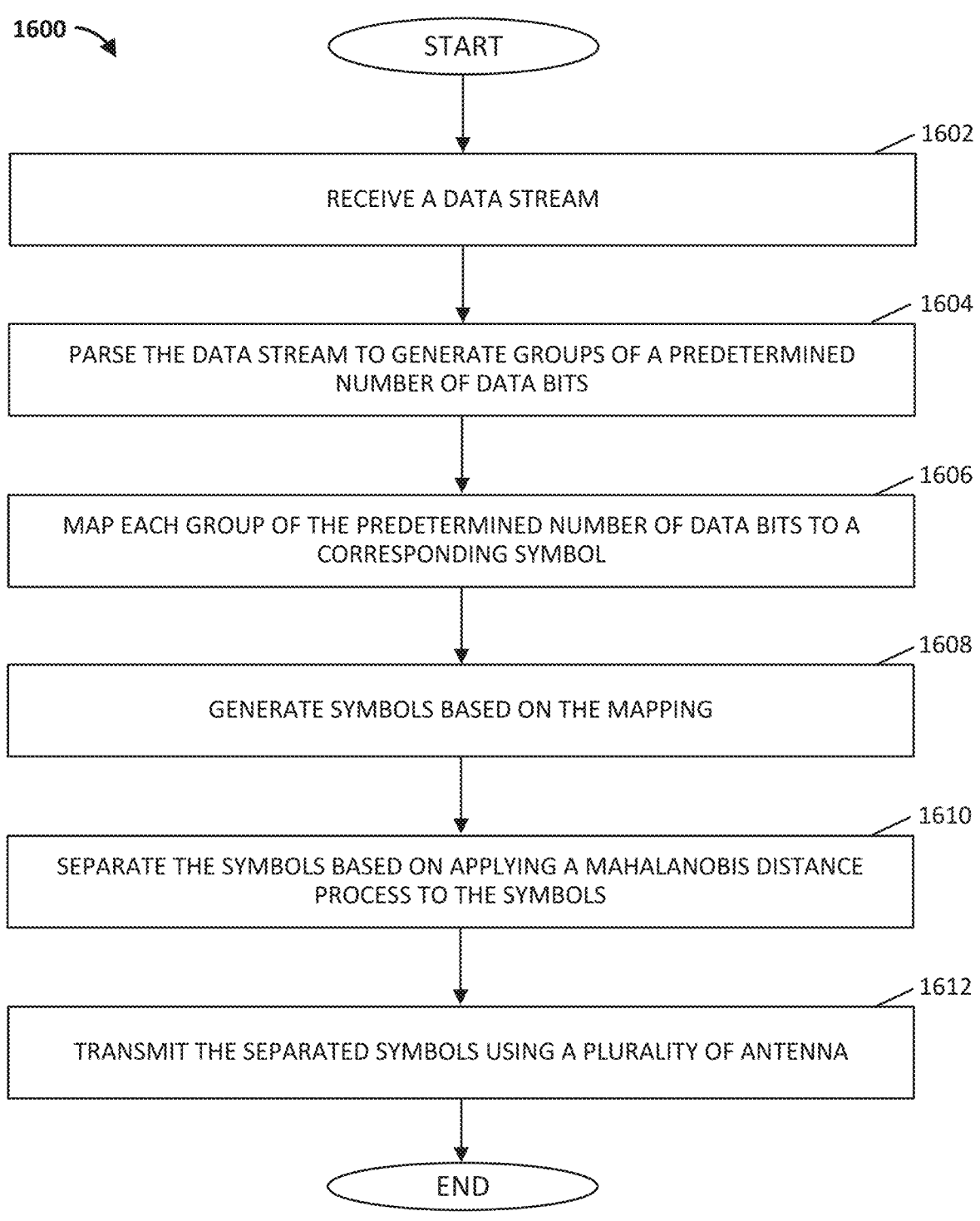

1600

START

1602
RECEIVE A DATA STREAM

1604
PARSE THE DATA STREAM TO GENERATE GROUPS OF A PREDETERMINED NUMBER OF DATA BITS

1606
MAP EACH GROUP OF THE PREDETERMINED NUMBER OF DATA BITS TO A CORRESPONDING SYMBOL

1608
GENERATE SYMBOLS BASED ON THE MAPPING

1610
SEPARATE THE SYMBOLS BASED ON APPLYING A MAHALANOBIS DISTANCE PROCESS TO THE SYMBOLS

1612
TRANSMIT THE SEPARATED SYMBOLS USING A PLURALITY OF ANTENNA

END

FIG. 16

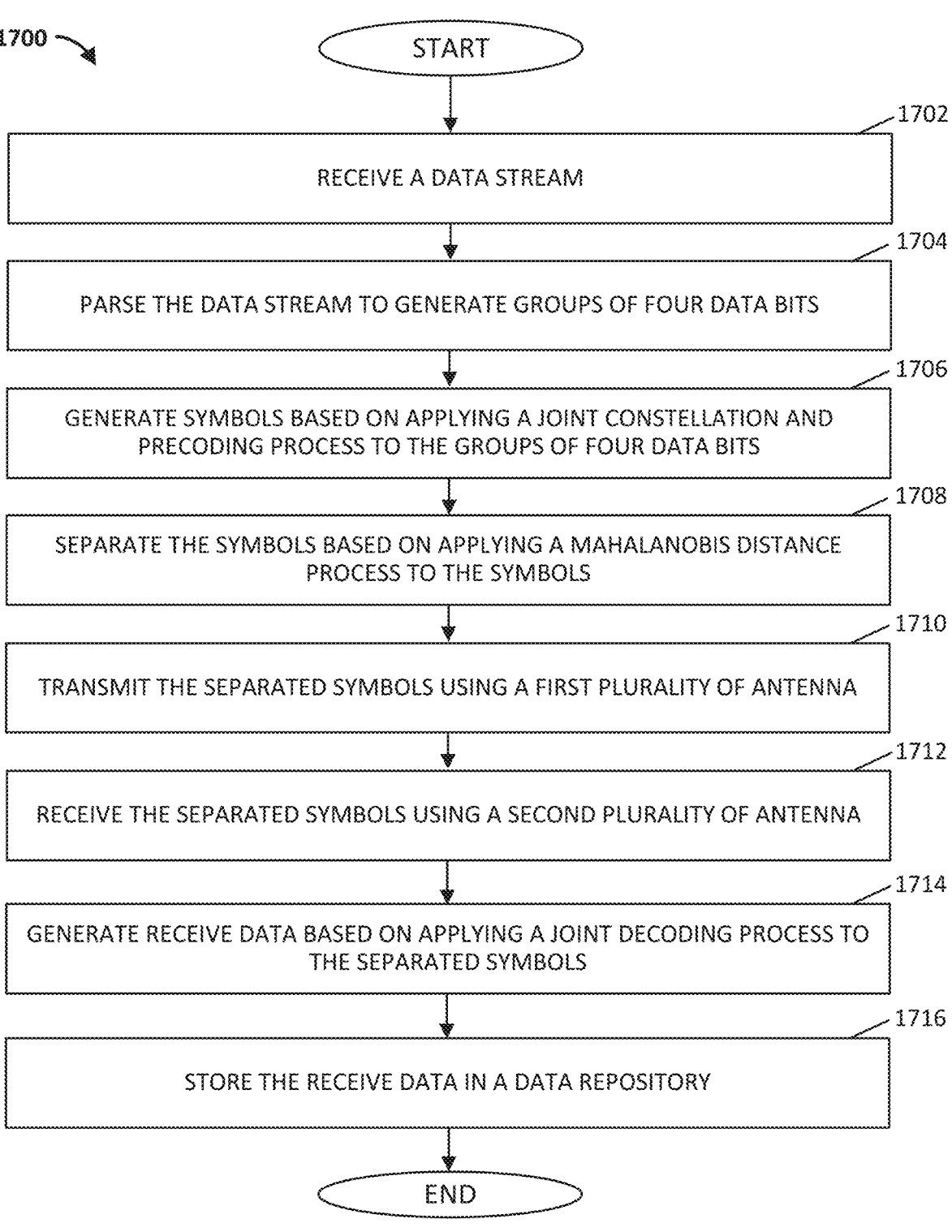

1700

START

1702

RECEIVE A DATA STREAM

1704

PARSE THE DATA STREAM TO GENERATE GROUPS OF FOUR DATA BITS

1706

GENERATE SYMBOLS BASED ON APPLYING A JOINT CONSTELLATION AND PRECODING PROCESS TO THE GROUPS OF FOUR DATA BITS

1708

SEPARATE THE SYMBOLS BASED ON APPLYING A MAHALANOBIS DISTANCE PROCESS TO THE SYMBOLS

1710

TRANSMIT THE SEPARATED SYMBOLS USING A FIRST PLURALITY OF ANTENNA

1712

RECEIVE THE SEPARATED SYMBOLS USING A SECOND PLURALITY OF ANTENNA

1714

GENERATE RECEIVE DATA BASED ON APPLYING A JOINT DECODING PROCESS TO THE SEPARATED SYMBOLS

1716

STORE THE RECEIVE DATA IN A DATA REPOSITORY

END

FIG. 17

SYSTEMS AND METHODS OF JOINT CONSTELLATION AND PRECODING FOR MIMO COMMUNICATIONS

CROSS-REFERENCE TO RELATED APPLICATION

This application claims the benefit of priority to U.S. Provisional Patent Application No. 63/486,153, filed on Feb. 21, 2023, the entire disclosure of which is expressly incorporated herein by reference to its entirety.

TECHNICAL FIELD

The disclosed embodiments generally relate to wireless systems and, more particularly, to wireless transmission schemes for use in wireless systems.

BACKGROUND

Precoding and modulation are important modules in wireless transmissions. Precoding designs improve the spectral efficiency and system performance in multi-input multi-output (MIMO) systems. Modulation is the process of varying one or more properties (amplitude, phase and/or frequency) of a waveform, such as a carrier signal, with a separate modulation input, or modulation signal, including information, e.g., bits, to be transmitted. Existing modulation schemes include both analog and digital modulation processes.

Existing modulation methods for wireless communication are mainly designed in a complex-valued plain, i.e., with a focus on the in-phase and quadrature (I/Q) components. Current complex-valued plain methods include, for example, M-ary phase shift keying (M-PSK) and M-ary quadrature modulation (M-QAM). Current communication methods utilizing MIMO systems include separately designed modulations based on each sub-channel. Current systems provide sub-optimal systems for symbol error rate (SER) due to regular structures.

SUMMARY

In some examples, an apparatus includes a plurality of antenna and a transmitter communicatively coupled to the plurality of antennae. The transmitter is configured to receive digital data for transmission. The transmitter is also configured to parse the digital data into data groups of a predetermined number of bits. Further, the transmitter is configured to apply a joint constellation and precoding process to the data groups and, based on the application of the joint constellation and precoding process, generate corresponding transmit symbols. The transmitter is also configured to generate a transmission signal based on the transmit symbols, and transmit the transmission signal to each of the plurality of antennae for wireless transmission.

In other examples a computer-implemented method includes receiving digital data for transmission. The method also includes parsing the digital data into data groups of a predetermined number of bits. Further, the method includes applying a joint constellation and precoding process to the data groups and, based on the application of the joint constellation and precoding process, generating corresponding transmit symbols. The method also includes generating a transmission signal based on the transmit symbols, and transmitting the transmission signal to each of a plurality of antennae for wireless transmission.

Further, in some examples, a tangible non-transitory computer-readable medium stores instructions that, when executed by at least one processor, cause the at least one processor to perform operations. The operations include receiving digital data for transmission. The operations also include parsing the digital data into data groups of a predetermined number of bits. Further, the operations include applying a joint constellation and precoding process to the data groups and, based on the application of the joint constellation and precoding process, generating corresponding transmit symbols. The operations also include generating a transmission signal based on the transmit symbols, and transmitting the transmission signal to each of a plurality of antennae for wireless transmission.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein:

FIG. 1 illustrates a block diagram of a wireless communication system, in accordance with some embodiments;

FIG. 8 illustrates constellation, decision regions, and projections on X-Y, Y-Z, and Z-X planes for a real-valued communication channel, in accordance with some embodiments;

FIGS. 14A and 14B illustrates comparisons of SER for the joint constellation and precoding method as compared to existing modulation methods, in accordance with some embodiments;

FIGS. 16 and 17 are flowcharts of exemplary processes for wireless transmissions, in accordance with some embodiments.

DETAILED DESCRIPTION

Figure 2:
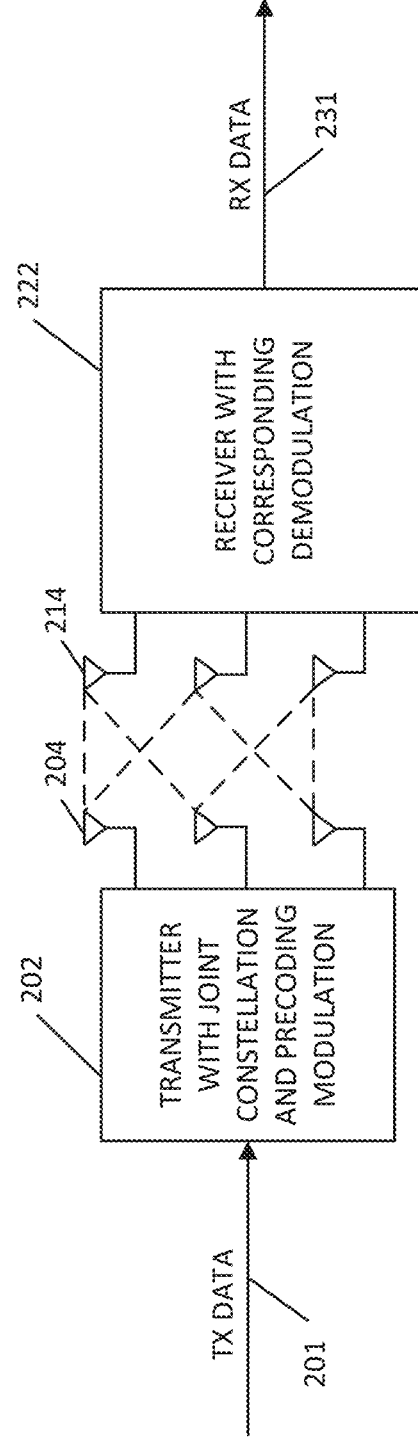
FIG. 2 illustrates a block diagram of a MIMO communication system, in accordance with some embodiments.

The description of the preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship. As used herein, the term "substantially" denotes elements having a recited relationship (e.g., parallel, perpendicular, aligned, etc.) within acceptable manufacturing tolerances.

In various embodiments, systems and methods utilizing point-to-point (P2P) multiple-input and multiple-output (MIMO) communications are disclosed. A joint constellation and precoding method is applied that designs a constellation for an entirety of a communication channel but not for each sub-channel. The SER of the disclosed joint constellation and precoding method is reduced as compared to existing sub-channel based systems. The disclosed joint constellation and precoding method is adapted to the channel states but does not require redesign of the constellation. The disclosed joint constellation and precoding method provides a high-dimensional digital constellation design for communication systems based on a maximum likelihood (ML) estimator. Multiplexing gain of MIMO systems may be used with the joint constellation and precoding method to enlarge the dimensions of the constellation space, improving symbol error rate performance on point-to-point transmissions.

The joint constellation and precoding method utilizes spatial, in-phase, and quadrature signal dimensions. A symbol error rate is minimized by maximizing a Mahalanobis distance between transmit symbols under a total power constraint. The joint constellation and precoding method jointly optimizes the transmit symbols so that the constellation offers the densest packing of spheres in the joint spatial, in-phase, and quadrature dimensions. In addition, the disclosed systems and methods utilize all antennas and sub-channels in a MIMO system. The disclosed systems and methods synthesize irregular constellations by shaping the transmit symbols efficiently to provide a high-dimension constellation which optimizes the MIMO multiplexing gain of each antenna, in addition to the in-phase and quadrature spacing, providing a higher degree of freedom in the high-dimension constellation. The joint constellation and precoding systems and methods can provide a similar symbol error rate as existing systems and methods while utilizing less power than existing methods and/or can provide lower symbol error rates at similar or lower transmission powers as existing systems and methods.

The disclosed systems and methods may allow for a unified approach that generates constellations and precoding for all antennas of a MIMO system simultaneously. The embodiments may apply a joint codebook during the joint constellation and precoding methods described herein, thereby eliminating the need for separate constellation designs for each antenna. In particular, rather than encoding bits into symbols and selecting multiple symbols to send, the disclosed systems and methods encode the symbols jointly based on the joint codebook. In addition, the disclosed systems and methods may apply a Mahalanobis distance (MD) to separate symbols within a constellation.

In various embodiments, a system including the joint constellation and precoding methods can be utilized for any suitable communication system. For example, the joint constellation and precoding methods may be applied to improve Wi-Fi (e.g., IEEE 802.11 standards), LTE, 5G cellular networks, etc. The joint constellation and precoding method generates a digital constellation that is more efficient in resource utilization and achieves a lower SER performance at similar power levels.

In some embodiments, a system includes a transmitter having a set of antennas, $N_t$, and a receiver having a set of antennas, $N_f$. A signal transmitted by the transmitter $x \in C^{Nt \times 1}$ and a signal received by the receiver $y \in C^{Nr \times 1}$ may include complex-valued vectors. If the channel, $H \in C^{Nr} \times C^{Nt}$, between the transmitter and the receiver is assumed to be known perfectly at both the transmitter and receiver side, the relation between the transmitted and received signal may be represented as:

$$y = Hx + n \qquad (1)$$

where $n \in \mathbb{C}^{Nr \times 1}$ is an additive white Gaussian noise (AWGN) whose elements are independent and identically distributed (i.i.d.) Gaussian random variables that follow $\mathcal{CN}(0, \sigma^2)$, and where $\sigma^2$ is a standard deviation of the noise on each receive antenna. If the average transmit power is defined as Pt, the signal-to-noise (SNR) becomes $$\gamma \triangleq \frac{P_t}{\sigma_N^2}.$$

In a P2P MIMO system, singular value decomposition (SVD) based precoding may be provided as an optimal precoder. Applying SVD to a channel matrix provides:

$$H = U \Lambda V^H \qquad (2)$$

where U and V are unitary matrices and $\Lambda$ is a diagonal matrix with decent diagonal order. Specifically, U may be a pre-processing matrix and V may be a precoding matrix.

In some embodiments, the transmitter multiplies the precoding matrix V with an input symbol stream s to generate x:

$$x = Vs \qquad (3)$$

The pre-processing matrix $U^H$ is multiplied on the receiver signal. In some embodiments, n' is defined as $n' \triangleq U^H n$, which provides $$y' \triangleq U^H y = U^H Hx + U^H n = \Lambda s + n' \qquad (4)$$

where y' is the signal to be de-modulated at the receiver. Since U is a unitary matrix and n is i.i.d:

$$\mathbb{E}\{n'^H n'\} = I \qquad (5)$$

then both n' and n are i.i.d. since:

$$\mathbb{E}\{(U^H n)^H (U^H n)\} = \mathbb{E}\{n^H U U^H n\} = \mathbb{E}\{n^H n\} = I \qquad (6)$$

In some embodiments, the number of available sub-channels is equal to the non-zero singular values of H, which may be denoted by $N_a$. The gain on the ith sub-channel may be determined by denoting the non-zero elements of $\Lambda$ to be $\lambda \triangleq [\lambda_1, \ldots, \lambda_i, \ldots, \lambda_{N_a}]^T$, which provides the gain as $\lambda_i^2$.

Traditional modulation strategies consider elements in a symbol vector s as different symbols and apply M-QAM individually. In contrast, in some embodiments, the joint constellation and precoding method treats the symbol vector s as being one symbol in $\mathbb{C}^{Na \times 1}$ space, which minimizes SER (denotes as $\epsilon_s$) globally and exploits the $\mathbb{C}$ benefits of a MIMO system. In some embodiments, the joint constellation and precoding method is an extension of irregular M-QAM to a higher dimensional space.

In some embodiments, symbols in the transmitter are selected by defining $n'' \triangleq pinv(\Lambda)n'$ and equalizing a pre-processed signal, y', as:

$$y'' \triangleq pinv(\Lambda)y' = s + pinv(\Lambda)n' = s + n'' \tag{7}$$

where pinv(·) represents the pseudo-inverse and only takes the reciprocal non-zero diagonal in $\Lambda$. In such embodiments, y", which is the equalized received signal after pre-processing, contains the symbol vector s and a noise vector $n'' \sim \mathcal{CN}(0, \Sigma)$, where $\Sigma = \Lambda^{-1}(\Lambda^{-1})^H$ is a diagonal covariance matrix. The degree of freedom of the symbol vector s is $N_a$ complex-valued variables, as y", s, $n'' \in \mathbb{C}^{Na \times 1}$ and the symbol vectors transmitted in sequence are independent. In some embodiments, a codebook for modulation is described as:

$$s \in \mathcal{S} \triangleq \{s_1, \dots, s_m, \dots, s_M\} \tag{8}$$

where $s_m \in \mathbb{C}^{Na \times 1}$ is the mth vector in $\mathcal{S}$ and represents the mth symbol. A matrix S including all of the M symbol vectors may be defined as:

$$S = [s_1, \dots, s_m, \dots, s_M] \in \mathbb{C}^{M \times N_a} \tag{9}$$

In some embodiments, s or $s_m$ represents a symbol vector and both $\mathcal{S}$ and S represent symbol vectors in different forms, $\mathcal{S}$ is a set containing all the symbol vectors and S lists the symbol vectors together as a matrix variable.

In some embodiments, a probability density function (PDF) that y" belongs to the mth symbol in $\mathcal{S}$ is:

$$\mathbb{P}\{y'' \to s_m\} = \tag{10}$$

$$\frac{1}{\sqrt{(2\pi)^{N_a}|\Sigma|}} e^{-\frac{1}{2}(y''-s_m)^H \Sigma^{-1}(y''-s_m)} = \frac{\prod_{i=1}^{N_a} \lambda_i^2}{\sqrt{(2\pi)^{N_a}}} e^{-\frac{1}{2}(y''-s_m)^H \Sigma^{-1}(y''-s_m)}$$

By applying a maximum likelihood (ML) detector, the decoded index of the symbol is:

$$m^* = \arg \max_m \mathbb{P}(y'' - s_m) \tag{11}$$

Due to the monotonicity of the exponential function, the maximization is equivalent to:

$$m^* = \arg \min_m (y'' - s_m)^H \Sigma^{-1}(y'' - s_m) \tag{12}$$

In some embodiments, the Mahalanobis distance (MD) between y" and noised $s_m$ is:

$$d_\mathcal{M}(y'', s_m, \Sigma) \triangleq \sqrt{(y'' - s_m)^H \Sigma^{-1}(y'' - s_m)} \tag{13}$$

In such embodiments, the ML detection is based on the closest MD y" at the receiver. In some embodiments, the MD is equal to the Euclidean distance among the symbols if the symbols are directly decoded using y'. In some embodiments, the minimum MD among the symbols is maximized to reduce the probability of symbol error, e.g.:

$$\max_{\mathcal{S}} \min_{s_i, s_j \in \mathcal{S}, i \neq j} d_\mathcal{M}^2(s_i, s_j, \Sigma) \tag{14a}$$

$$\text{s.t.} \quad \frac{1}{M} \sum_{i=1}^{M} |s_i|^2 \leq P_t \tag{14b}$$

In some embodiments, to satisfy a power average constraint, the symbol vectors may be linearly scaled and reassigned by:

$$s_m \triangleq \frac{P_t}{\frac{1}{m}\sum_{i=1}^{M}|s_i|^2} \cdot s_m = \frac{MP_t}{\sum_{i=1}^{M}|s_i|^2} \cdot s_m \tag{15}$$

In some embodiments, the joint constellation and precoding method may be implemented in one or more communication systems. The communication systems may be configured to implement a constellation optimization process. In some embodiments, the constellation optimization process includes an algorithm, where:

| Algorithm 1 Minimum Distance Maximization |
| --- |
| 1: Inputs: $P_t$, M, and H |
| 2: Initialize S* = 0 and d* $_\mathcal{M}$ = 0. |
| 3: Calculate the SVD of H using (2). |
| 4: for i in [1, . . . , 10] do |
| 5:    Initialize S randomly with average power $P_t$. |
| 6:    Obtain S by optimizing (14) using fminimax. |
| 7:    Linearly adjust the average power using (15). |
| 8:    Calculate d $_\mathcal{M}$ of S using (13). |
| 9:    if d* $_\mathcal{M}$ < d $_\mathcal{M}$ then |
| 10:      Save the outcome as S* = S and d* $_\mathcal{M}$ = d $_\mathcal{M}$. |
| 11:    end if |
| 12: end for |
| 13: Reform S* as $\mathcal{S}$* using (8)-(9). |
| 14: Outputs: S* and d* $_\mathcal{M}$ |

The joint constellation and precoding method has a symbol layout that shares a lattice-like shape but that are non-symmetric over different directions in the coordinate. In some embodiments, by measuring using MD, the lattice becomes symmetric.

Figure 6:
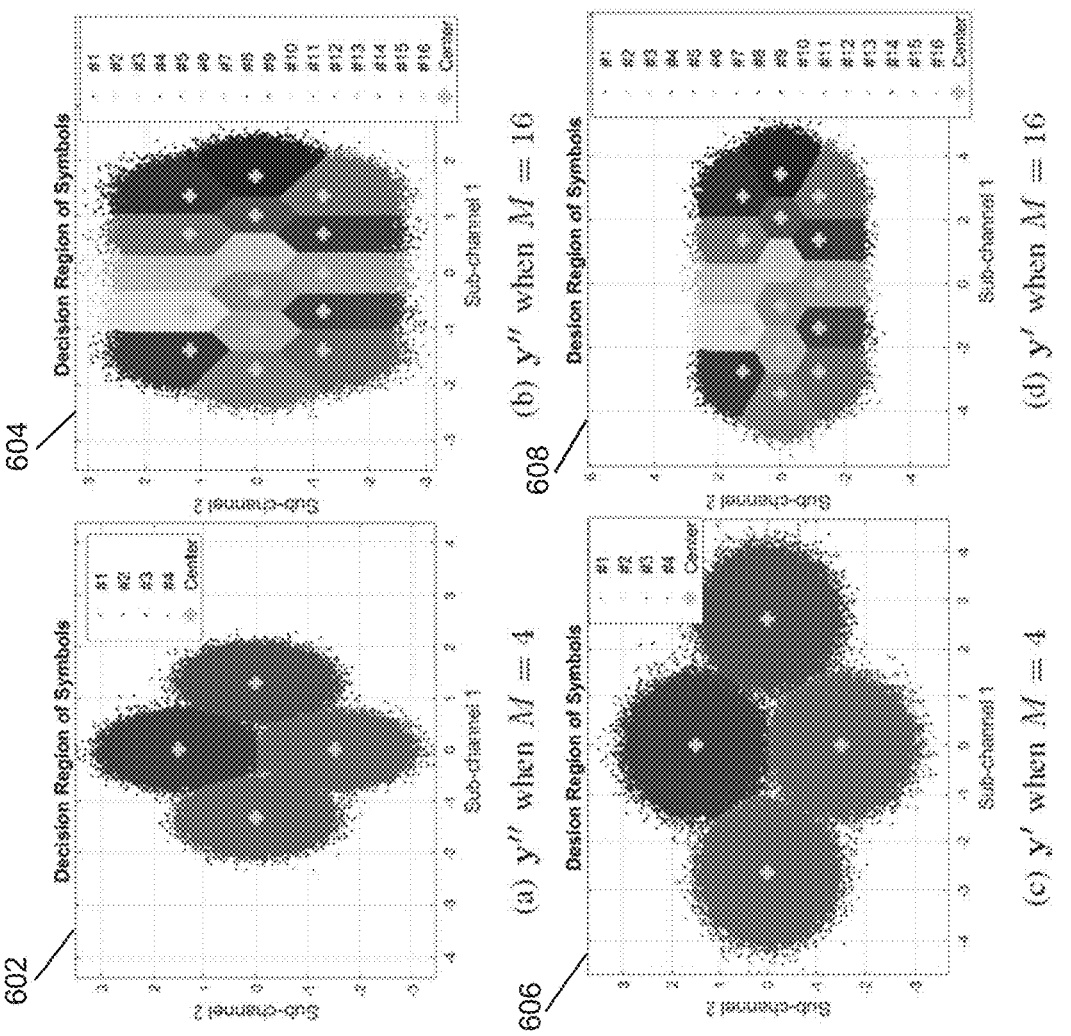
FIG. 6 illustrates constellation and decision regions in a real-valued channel, in accordance with some embodiments.
Figure 7:
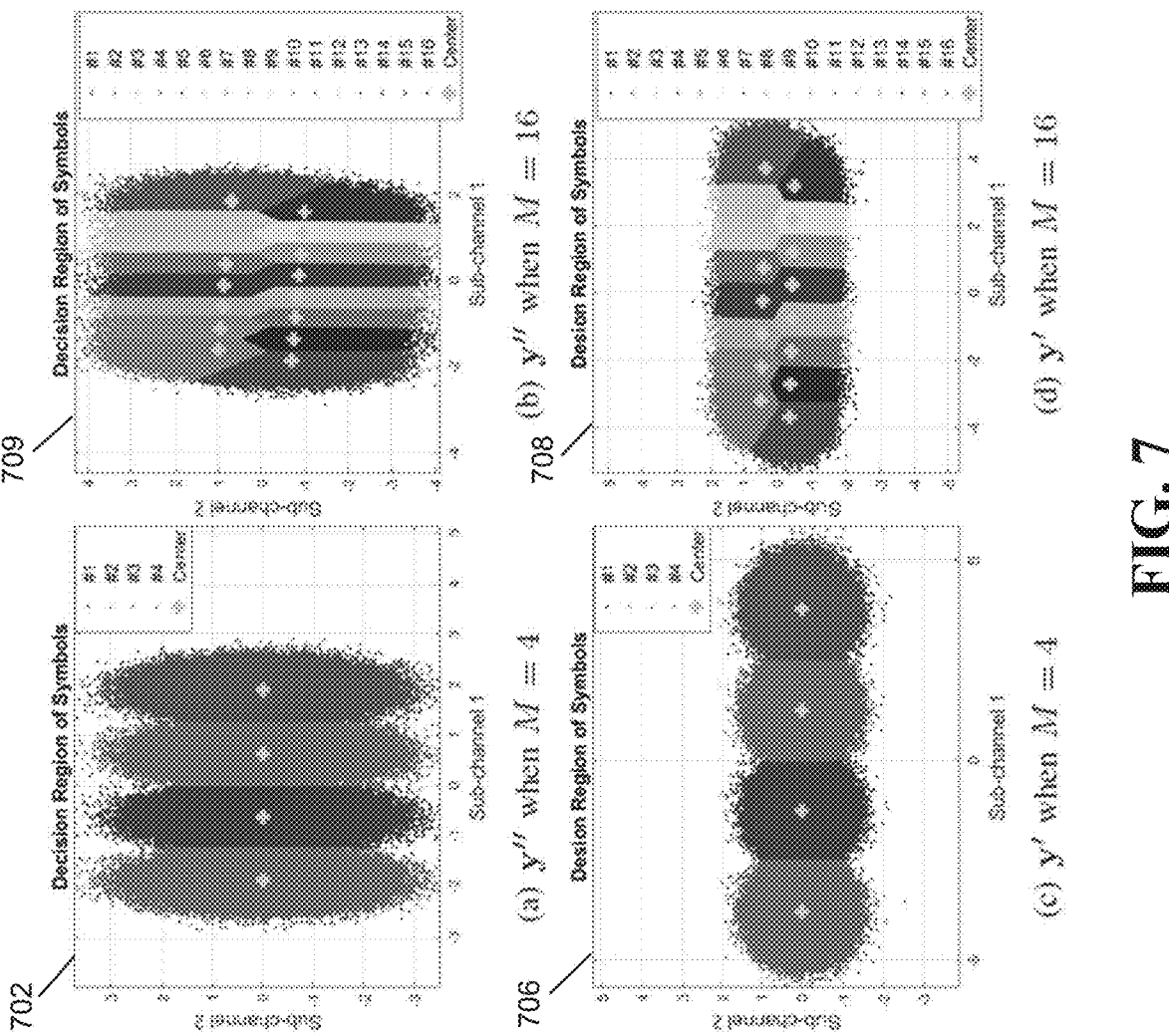
FIG. 7 illustrates constellation and decision regions in a real-valued channel, in accordance with some embodiments.

In some embodiments, the joint constellation and precoding method may be applied to a real-valued MIMO channel with two non-zero singular values. The symbol vector is able to be shown on a 2-dimensional (2D) plane while the axis are the two sub-channels as illustrated in FIGS. 6 and 7. For this example, SNR=10 dB and $P_t$=2 W. The dots in the plots of FIGS. 6 and 7 represent the symbols that have passed through the channel and have been post-processed by the receiver. Different shades of grey distinguish the symbols. More specifically, for plots 602, 604, 702, and 704, each dot represents an instance of y", i.e., the equalized received signal after pre-processing. For plots 606, 608, 706, and 708, each dot is a y', i.e., the pre-processed signal. The cross signs in FIGS. 6 and 7 represent the center of each respective scatter. Specifically, the cross signs for plots 602, 604, 702, and 704 are coordinates of transmitted symbols s.

For example, in FIG. 6, the singular values of the channel is $\lambda_1=[2,1]^H$ which means the first sub-channel has a higher SNR than the other one. For four symbols, the constellation and decision boundaries are depicted by different shades in FIG. 6. In some instances, the optimal codebooks for MIMO systems with M=4 (i.e., MIMO system with modulation order of 4) and M=16 are $s_1{}^4$ and $S_1{}^{16}$, as shown below in equations 16 and 17, respectively, where the lower script represents the example index and the upper script represents the value of M. When the SNR difference between the sub-channels is not large, more power will be allocated to the weaker one, and the minimum MD is $d_{\mathcal{M}}^2=9.14$. For M=16, as illustrated in plot 604, the symbols are laid in hexagonal but squeezed lattices. The coordinates of the constellation are listed in Table I.

$$S_1^{(4)} = \begin{cases} s_1 = [-0.00 \quad -1.51]^T, \\ s_2 = [\ 1.31 \quad -0.00]^T \\ s_3 = [-0.00 \quad 0.51]^T \\ s_4 = [-1.31 \quad -0.00]^T \end{cases} \tag{16}$$

$$s_1^{(16)} = \begin{cases} s_1 = [\ 1.03 \quad 0.00]^T, \ s_2 = [\ 0.00 \quad 0.19]^T, \ s_3 = [\ 0.34 \quad 0.00]^T, \\ s_4 = [\ 0.69 \quad -1.19]^T, \ s_5 = [-0.69 \quad -1.19]^T, \ s_6 = [\ 0.00 \quad -1.19]^T, \\ s_7 = [\ 1.38 \quad -1.19]^T, \ s_8 = [-1.38 \quad 1.19]^T, \ s_9 = [\ 1.72 \quad 0.00]^T, \\ s_{10} = [-0.69 \quad 1.19]^T, \ s_{11} = [-1.72 \quad 0.00]^T, \ s_{12} = [\ 1.38 \quad -1.19]^T, \\ s_{13} = [-0.34 \quad 0.00]^T, \ s_{14} = [\ 1.38 \quad 1.19]^T, \ s_{15} = [\ 0.69 \quad 1.19]^T, \\ s_{16} = [-1.03 \quad 0.00]^T \end{cases} \tag{17}$$

TABLE I

The coordinate of the constellation in Example 1.

| # | sub-channel 1 | sub-channel 2 |
|---|---|---|
| | M = 4 | |
| 1 | −0.00 | −1.51 |
| 2 | 1.31 | −0.00 |
| 3 | −0.00 | 1.51 |
| 4 | −1.3 | −0.00 |
| | M = 16 | |
| 1 | 1.03 | −0.00 |
| 2 | 0.00 | 1.19 |
| 3 | 0.34 | −0.00 |
| 4 | 0.69 | −1.19 |
| 5 | −0.69 | −1.19 |
| 6 | 0.00 | −1.19 |
| 7 | 1.38 | −1.19 |
| 8 | −1.38 | 1.19 |
| 9 | 1.72 | −0.00 |
| 10 | −0.69 | 1.19 |
| 11 | −1.72 | 0.00 |
| 12 | −1.38 | −1.19 |
| 13 | −0.34 | 0.00 |

TABLE I-continued

The coordinate of the constellation in Example 1.

| # | sub-channel 1 | sub-channel 2 |
|---|---|---|
| 14 | 1.38 | 1.19 |
| 15 | 0.69 | 1.19 |
| 16 | −1.03 | 0.00 |

As another example, in FIG. 7, $\lambda_2=[2,0.5]^T$, the first sub-channel is much stronger as compared to the prior example. In some instances, the optimal codebooks for M=4 and M=16 are given below in equations 19 and 18, respectively. Once the difference of sub-channel gains becomes larger, the second sub-channel is abundant and all the power is put in the other one, and the minimum MD becomes $d_{\mathcal{M}}^2=6.4$. The MD in the two channels are 1.90 and 0.96 while more power has been allocated to the sub-channel 1 in plot 704 compared to plot 604. It can be seen that the optimal constellation may vary dramatically with the channel status even in the two-dimensional (2D) case. The coordinates of the constellation for this example are listed in Table II.

$$s_2^{(4)} = \begin{cases} s_1 = [-0.63 \quad 0.00]^T, \\ s_2 = [\ 1.90 \quad 0.00]^T, \\ s_3 = [-0.00 \quad 0.00]^T, \\ s_4 = [\ 0.63 \quad 0.00]^T \end{cases} \tag{19}$$

-continued $$s_{2}^{(16)} = \begin{cases} s_1 = [\ 1.60 \quad -0.99]^T, & s_2 = [-0.86 \quad -0.78]^T, & s_3 = [\ 0.86 \quad 0.78]^T, \\ s_4 = [\ 1.85 \quad 0.70]^T, & s_5 = [-1.85 \quad -0.70]^T, & s_6 = [\ 1.35 \quad 0.74]^T, \\ s_7 = [-1.59 \quad 0.97]^T, & s_8 = [\ 0.61 \quad 0.90]^T, & s_9 = [\ 1.10 \quad -0.94]^T, \\ s_{10} = [\ 0.61 \quad -0.90]^T, & s_{11} = [\ 0.37 \quad 0.82]^T, & s_{12} = [-0.37 \quad -0.82]^T, \\ s_{13} = [-1.10 \quad 0.94]^T, & s_{14} = [-1.36 \quad -0.74]^T, & s_{15} = [\ 0.12 \quad -0.86]^T, \\ s_{16} = [-0.12 \quad 0.86]^T \end{cases} \quad (18)$$

TABLE II

The coordinate of the constellation in Example 2.

| # | sub-channel 1 | sub-channel 2 |
|---|---|---|
| | M = 4 | |
| 1 | −0.63 | 0.00 |
| 2 | 1.89 | 0.00 |
| 3 | −1.89 | 0.00 |
| 4 | 0.63 | 0.00 |
| | M = 16 | |
| 1 | 1.59 | −0.97 |
| 2 | −0.86 | −0.78 |
| 3 | 0.86 | 0.78 |
| 4 | 1.85 | 0.70 |
| 5 | −1.85 | −0.70 |
| 6 | 1.36 | 0.74 |
| 7 | −1.59 | 0.97 |
| 8 | −0.61 | 0.90 |
| 9 | 1.10 | −0.94 |
| 10 | 0.61 | −0.90 |
| 11 | 0.37 | 0.82 |
| 12 | −0.37 | −0.82 |
| 13 | −1.10 | 0.94 |
| 14 | −1.36 | −0.74 |
| 15 | 0.12 | −0.86 |
| 16 | −0.12 | 0.86 |

In some embodiments, the joint constellation and precoding method may be applied to optimize a constellation in a 3D space. For example, in some embodiments, real-valued channels with three non-zero singular values: $\lambda_3=[1,1,1]^T$ and $\lambda_4=[2,1,0,5]^T$ are considered, as shown in FIG. 8. The darker clusters represent and distinguish y″ while the lighter clusters are projections to corresponding coordinate surfaces, illustrating a high-dimensional structure of the constellation. When all of the sub-channels are nearly equal, all the sub-channels are used equally as illustrated in plot 802. However, when one of the sub-channel's gain is weak such as with respect to $\lambda_4$, the constellation goes to a lower dimension, as illustrated in plot 804 (e.g., the scatters of plot 804 are more vertically elongated than the scatters of plot 802).

Figure 9:
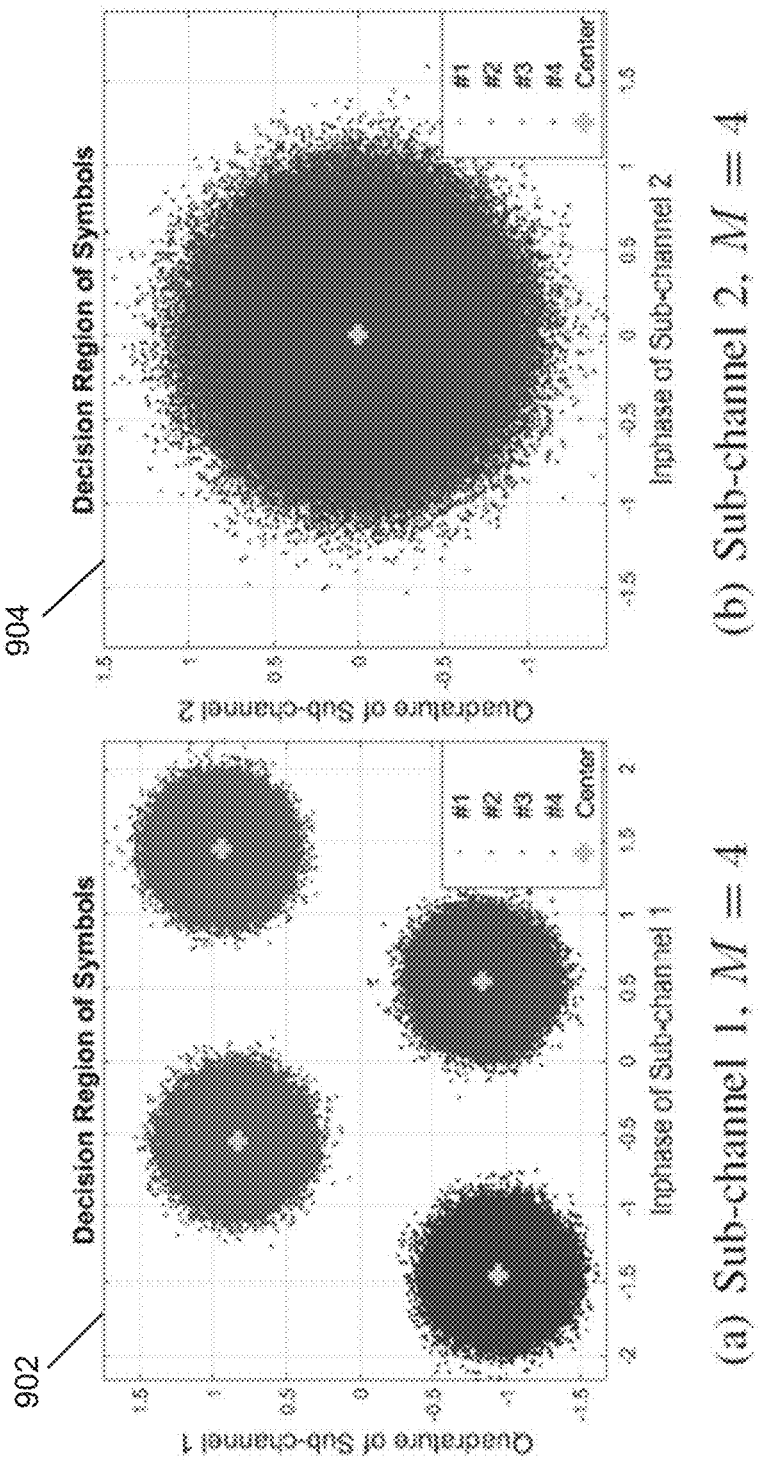
FIG. 9 illustrates constellation and decision regions in a two-antenna complex-valued system, in accordance with some embodiments.
Figure 10:
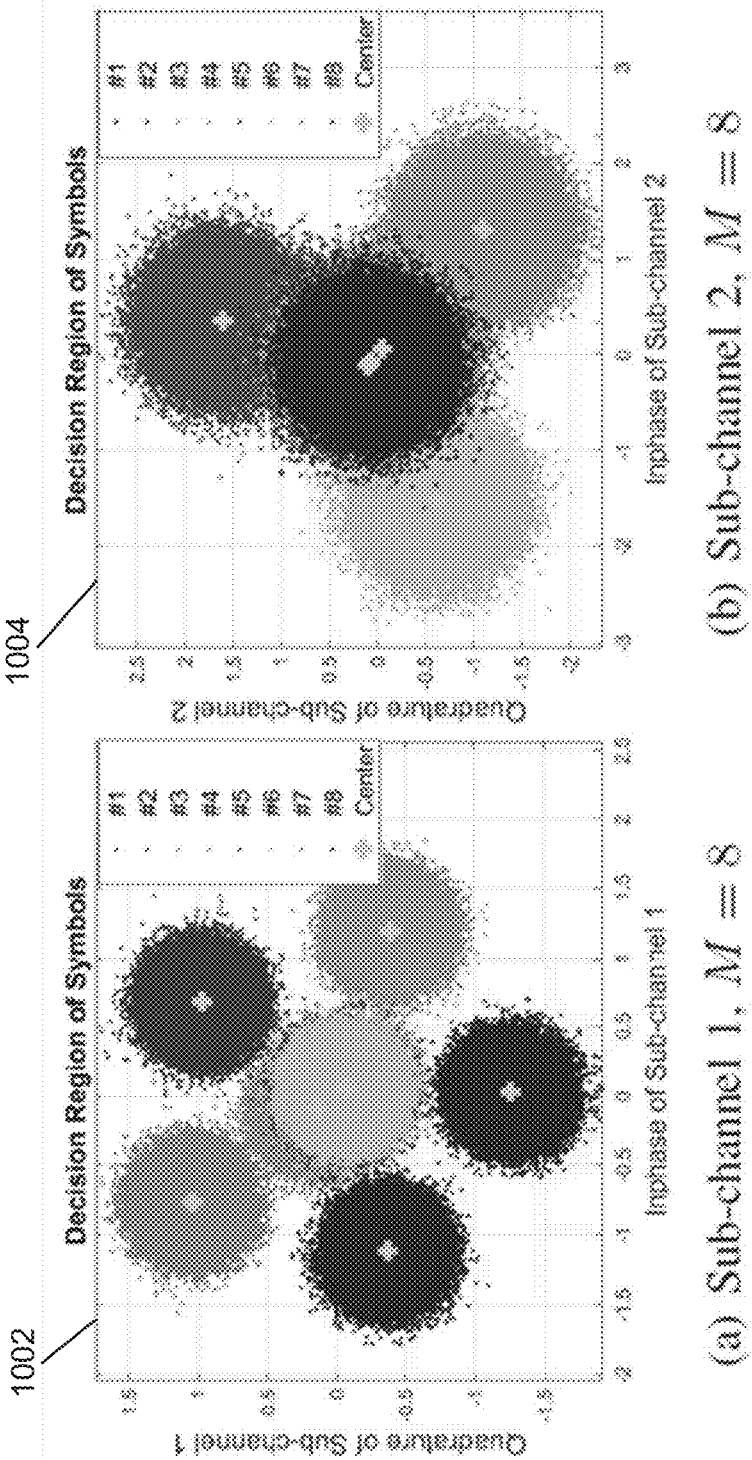
FIG. 10 illustrates constellation and decision regions in a two-antenna complex-valued system, in accordance with some embodiments.

In some embodiments, the joint constellation and precoding method may be applied to optimize a constellation in a 4D space. For example, in a complex-valued channel with two nonzero singular values $\lambda_5=[2,1]^T$, the symbols can be arranged in a 4-dimensional (4D) space. Observations in two sub-channels illustrate the coordinates of the symbols as two margins. When M=4, one optimal constellation is shown in plots 902, 904 of FIG. 9. In the first two dimensions in sub-channel 1, the four symbols are laid in a diamond shape as indicated in plot 902 (and similar to plot 602), but the symbol has no power on the remaining sub-channel, as indicated in plot 904. In some examples, when M=8, as in the constellation shown by plot 1002 of FIG. 10, five symbols are laid at the periphery in sub-channel 1 while the other three symbols are close to the center. It will be appreciated that the symbols are separated in 4D space, for example, as the distinguishable peripheral five symbols in plot 1002 correspond to the overlapped symbols at the center of plot 1004, and the three overlapped symbols in plot 1002 are separated in plot 1004.

In some embodiments, a bit sequence containing 20 bits may be transmitted through a channel in 4D space. For a bit sequence, such as:

{00,11,10, 00, 11,10,01, 11, 00, 01} and where M=4, the symbol sequence generated by the joint constellation and precoding method may be:

{$s_1$, $s_2, s_4$, $s_1, s_2, s_4, s_3$, $s_2$, $s_1$, $s_3$} where {$s_1$, $s_2$, $s_3$, $s_4$} are in the bit sequence with bit-symbol labeling to minimize the bit error rate (BER). For A-SVD, the symbol sequence is:

{$a_1$, $a_3$, $a_4$, $a_1$, $a_3$, $a_4$, $a_2$, $a_3$, $a_1$, $a_2$} where $$\mathcal{A} = \begin{cases} a_1 = [-1.00 + 1.00i \quad 0.00 + 0.00i]^H, \\ a_2 = [-1.00 - 1.00i \quad 0.00 + 0.00i]^H, \\ a_3 = [\ 1.00 - 1.00i \quad 0.00 + 0.00i]^H, \\ a_4 = [\ 1.00 + 1.00i \quad 0.00 + 0.00i]^H, \end{cases}$$

is the codebook of A-SVD. As shown in Table III below, the joint constellation and precoding method has the highest MD together with Adaptive SVD precoding (A-SVD) and optimal linear precoding (OLP) when M=4. When M>4, the joint constellation and precoding method provides nearly double distance as compared to other methods and the SER is highly reduced.

TABLE III

Minimum Mahalanobis distance and SER among proposed and existing modulations on complex-valued channel with singular values [2, 1].

| Minimum $d^2_M$ among the M symbols: | | | | | |
|---|---|---|---|---|---|
| M | Pt | Proposed | A-SVD | OLP | BL-WF | BL-EQ |
| 4 | 2 | 16.00 | 16.00 | 16.00 | 11.00 | 8.00 |
| 8 | 2 | 8.45 | 4.99 | 5.33 | 3.67 | 4.00 |
| 16 | 2 | 5.57 | 3.20 | 3.20 | 2.50 | 2.67 |

| Symbol error rate: | | | | | |
|---|---|---|---|---|---|
| M | SNR | Proposed | A-SVD | OLP | BL-WF | BL-EQ |
| 4 | 5 dB | 0.03% | 0.03% | 0.03% | 0.32% | 1.20% |
| 8 | 8 dB | 0.06% | 0.45% | 0.56% | 2.02% | 0.64% |
| 16 | 10 dB | 0.06% | 0.68% | 0.84% | 0.95% | 1.28% |

The disclosed joint constellation and precoding method provides better SER and BER performance as compared to current state-of-the-art modulation, such as A-SVD, OLP, bit allocation with SVD precoding and water-filling as a power allocation algorithm (BL-WF), and bit-allocation with SVD precoding and equal power allocation (BL-EQ). Each of these methods aim to reduce the SER under the average power constraint and a fixed bit rate in the transmissions.

The disclosed joint constellation and precoding method provides advantages over complex-valued MIMO channels with equaled gains and randomly generated channels. For the following comparison, the average transmit power is set as $P_r=2$ W, the SNR is varied from $-10$ to 20 dB. For each SNR, a transmission of $10^7$ random symbols is simulated using each method and the SER is calculated. For the labeling or named bit-to-symbol mapping, the existing methods are based on classic M-QAM, and Gray coding is applied.

Figure 11:
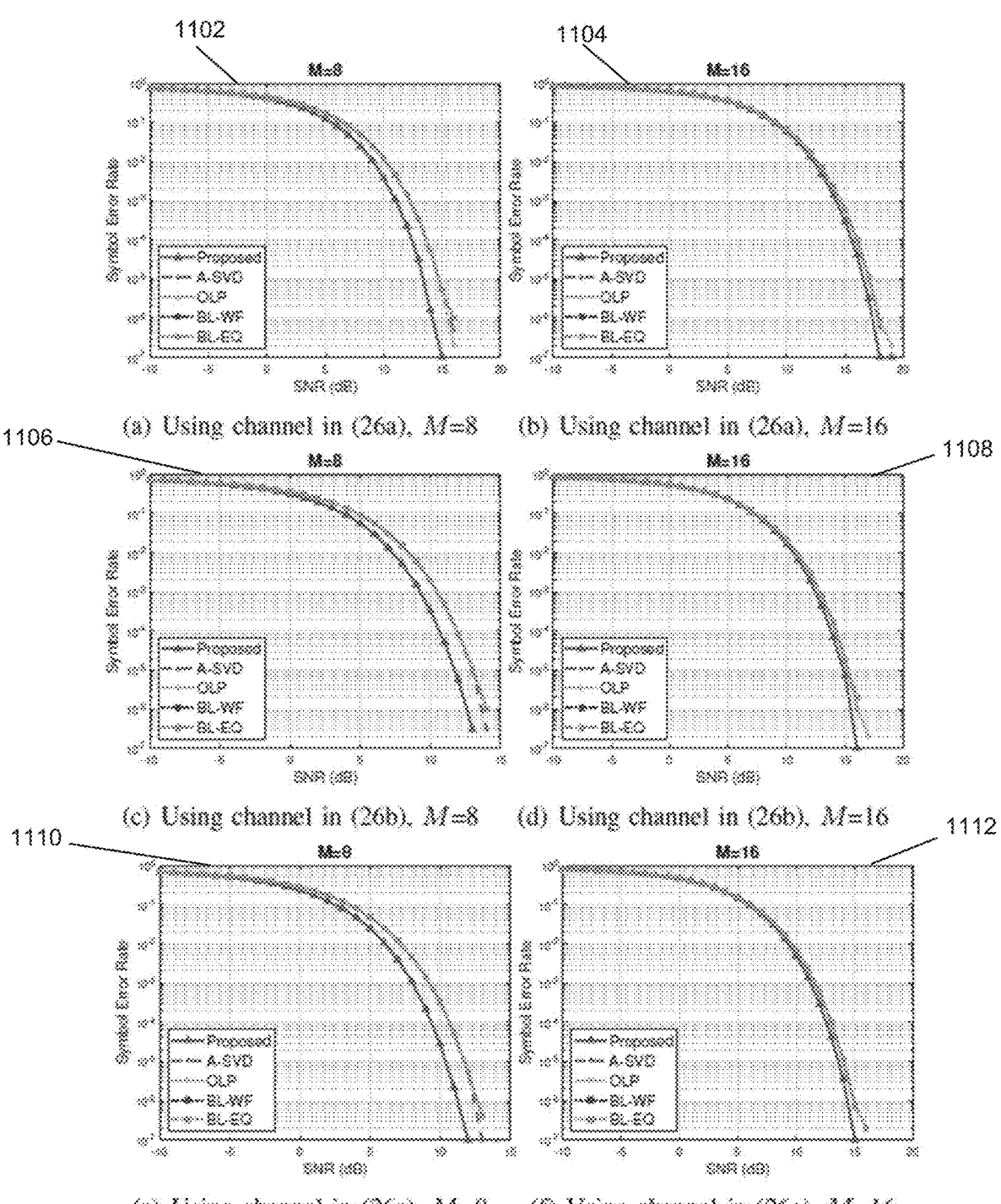
FIG. 11 illustrates a comparison of SER for the joint constellation and precoding method as compared to existing modulation methods, in accordance with some embodiments.

For an ideal case that the sub-channels have identical gains, the SER performance is illustrated in plots of FIG. 11. The singular values of the channels are:

$$\lambda_6 = [1, 1]^T,$$
$$\lambda_7 = [1, 1, 1]^T,$$
$$\lambda_8 = [1, 1, 1, 1]^T$$

corresponding to the three rows of figures, respectively. Specifically, $\lambda_6$ corresponds to plots 1102 and 1104, $\lambda_7$ corresponds to plots 1106 and 1108, and $\lambda_8$ corresponds to plots 1110 and 1112. Once the sub-channel gains are equal, the water-filling and equal power allocation are the same. By redesigning the constellation using the joint constellation and precoding method, the SERs are reduced in all cases. In some embodiments, the improvement is provided, at least in part, from the joint optimization of constellation and pre-coding. The distance between the symbols is enlarged and leads to improved performance. It is worth noting that the gap achieved at M=8 is not because the rectangular layout of 8-QAM has severely less sufficiency layout on the I/Q plane. The three bits are allocated on more than one sub-channel, rather than given to the same one. For larger values of M, the gap still exists, but may not be as dominant as the amount of room left for improving the symbol distance is reduced.

Figure 12:
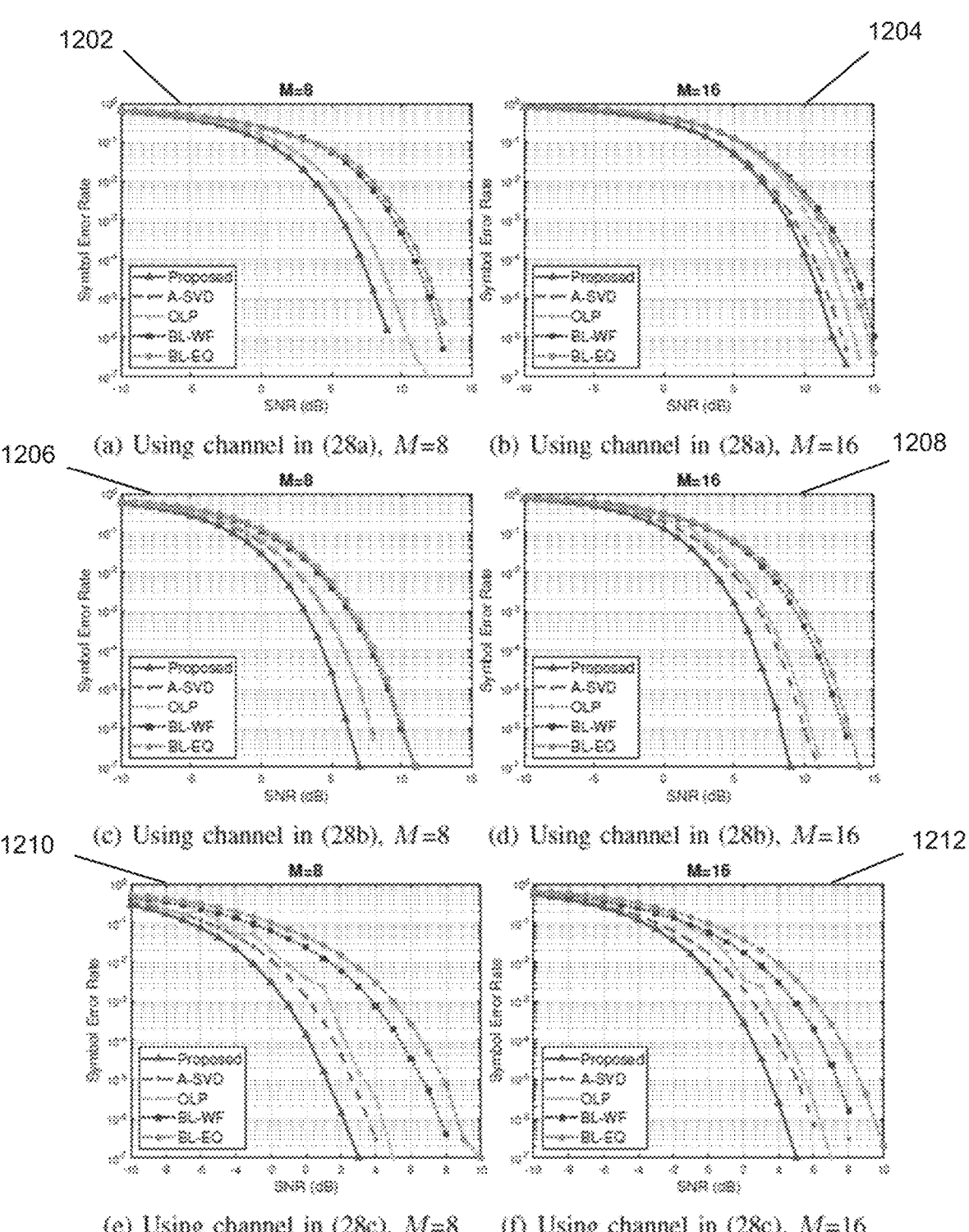
FIG. 12 illustrates a comparison of SER for the joint constellation and precoding method as compared to existing modulation methods, in accordance with some embodiments.

For embodiments in which channels are randomly generated, such as, for example, three channels:

$$H = \begin{bmatrix} -0.04 - 0.57i & 1.16 - 0.46i \\ -0.18 - 0.78i & -1.57 - 1.59i \end{bmatrix},$$

$$H = \begin{bmatrix} -0.66 - 1.06i & 0.40 - 1.44i & 1.86 + 0.34i \\ 0.03 - 1.02i & -1.22 - 0.36i & 0.74 - 0.75i \\ 0.36 - 1.31i & 0.26 + 1.12i & 0.21 - 0.43i \end{bmatrix},$$

$$H = \begin{bmatrix} 0.73 + 1.44i & 0.63 + 1.53i & -0.49 + 1.34i & -2.38 + 1.69i \\ 1.82 - 0.22i & 1.00 + 0.91i & 1.50 - 0.61i & 1.06 + 0.92i \\ -1.01 - 0.90i & 0.06 - 1.78 & 1.34 - 0.16i & 0.66 - 0.42i \\ 0.83 - 0.43i & 0.09 - 1.64i & 0.86 - 0.25 & 2.15 + 1.16i \end{bmatrix}$$

where the singular values are:

$$\lambda_9 = [2.60, \ 0.87]^T,$$
$$\lambda_{10} = [3.22, \ 1.80, \ 0.96]^T,$$
$$\lambda_{11} = [5.69, \ 2.46, \ 2.23, \ 0.29]^T$$

the SER performances are shown in FIG. 12. Specifically, $\lambda_9$ corresponds to plots 1202 and 1204, $\lambda_{10}$ corresponds to plots 1206 and 1208, and $\lambda_{11}$ corresponds to plots 1210 and 1212.

The water-filling power allocation in general outperforms than the equal power allocation at least because the sub-channel gain is considered. However, BL-WF is not optimal due to the non-Gaussian symbols. In addition, if the power allocated to a sub-channel is not enough for any M-QAM transmission, such amount of power is wasted and leads to a lower SER compared even with BL-EQ. Further, A-SVD and OLP each work better than BL-WF since they take the M-QAM constellation in to optimizations. The disclosed joint constellation and precoding method provides improved performance compared with each of these other approaches. The performance gap is more obvious than the case with equal sub-channel gains, but is nonetheless realized in all systems. The results show the necessity for the new design of the constellation. A better power efficiency is achieved by more fully utilizing the high-dimensional symbol vector space spanned by I/Q and multiple antennas.

In some evaluations, the disclosed joint constellation and precoding method may reduce SERs by 5.36, 6.36, and 12.50 times over conventional methods corresponding to MIMO transmission systems with modulation orders of M=8, 16, and 32. The BER-to-SER ratio of the disclosed joint constellation and precoding method may be around 0.5, providing a significant increase over a 0.2 reached by A-SVD. The disclosed joint constellation and precoding method can provide the highest distance, leading to the best SER performance, while providing the lowest BER, of the evaluated methods.

Figure 13:
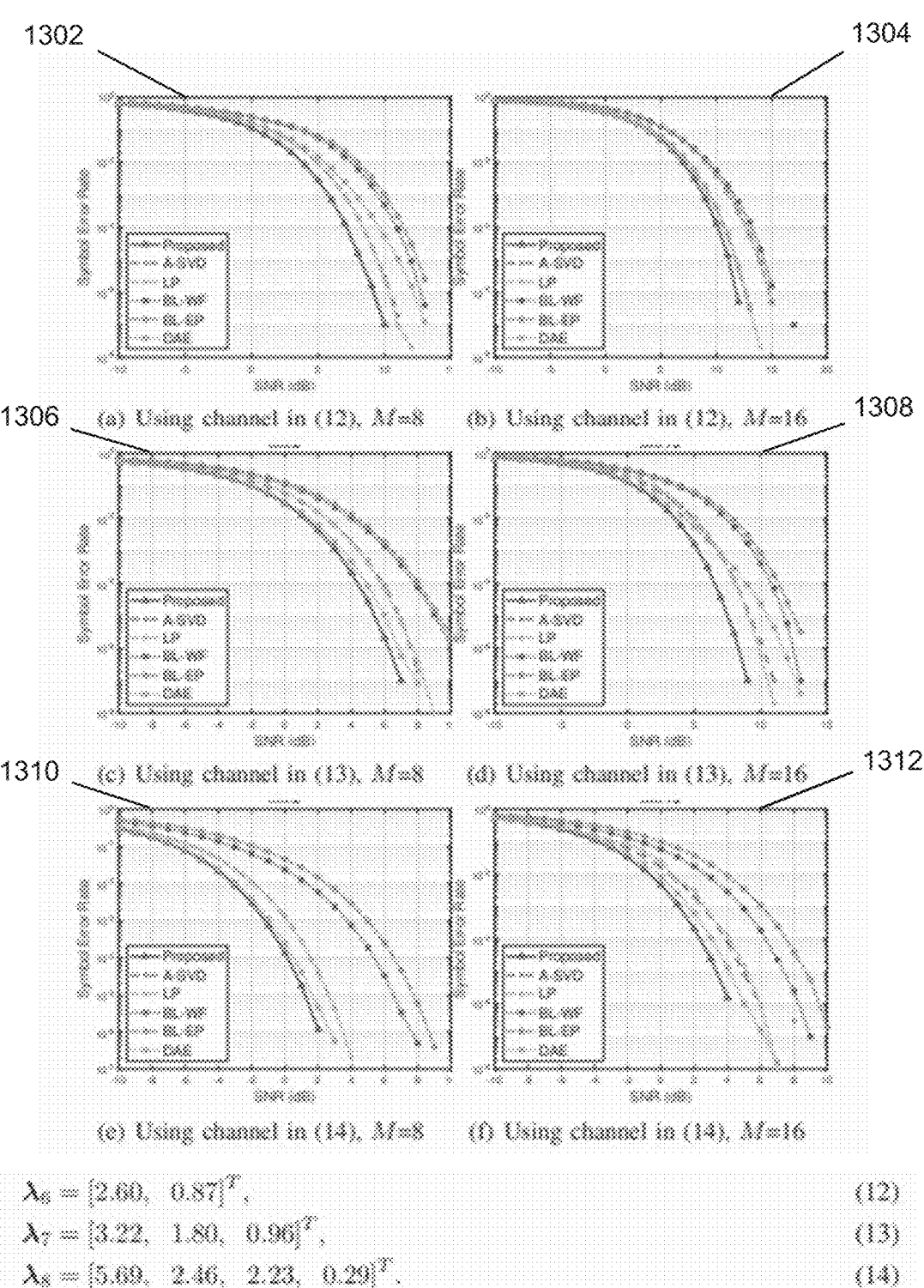
FIG. 13 illustrates a comparison of SER for the joint constellation and precoding method as compared to existing modulation methods, in accordance with some embodiments.

FIG. 13 illustrates the SER performance for the case where the singular values of the channels are:

$$\lambda_6 = [2.60, \ 0.87]^T, \tag{12}$$
$$\lambda_7 = [3.22, \ 1.80, \ 0.96]^T, \tag{13}$$
$$\lambda_8 = [5.69, \ 2.46, \ 2.23, \ 0.29]^T. \tag{14}$$

where $\lambda_6$ corresponds to plots 1302 and 1304, $\lambda_7$ corresponds to plots 1306 and 1308, and $\lambda_8$ corresponds to plots 1310 and 1312.

More specifically, FIG. 13 compares the approach described herein (labeled "Proposed") with various conventional approaches, including a Deep Autoencoder (DAE) based constellation design. The performance results show that the approach described herein is superior to DAE-based constellation designs, such as those described in X. Zhang X, M. Vaezi M, T. O'Shea, "SVD-embedded deep autoencoder for MIMO communications," in Proc. IEEE Int. Conf. Commun. (ICC), pp. 1-5, 2022.

FIGS. 14A and 14B compare SER of the approach described herein with other methods as a function of the modulation order (M) and illustrates that the approach (labeled "Proposed") described herein has better performance for all modulation orders. Specifically, graphs 1402 and 1404 show the effect of the modulation order M on SER for different methods, including (i) Adaptive SVD precoding (A-SVD), linear precoding (LP), bit allocation with SVD precoding and water-filling as a power allocation algorithm (BL-WF), and bit-allocation with SVD precoding and equal power allocation (BL-EP) (also referred to herein as BL-EQ). The channels for graph 1402 and graph 1404 are (13) and (14) with SNR=5 dB. The approach described herein has the lowest SER among all methods. For example, assume the required SER is $10^{-6}$, the approach described herein can transmit 4 bits per symbol (M=16) while the other methods can only transmit at most 3 bits per symbol (M=8). Also, for the same M, the SER for the approach described herein is reduced 10 times compared to A-SVD and LP.

Figures 15A, 15B:
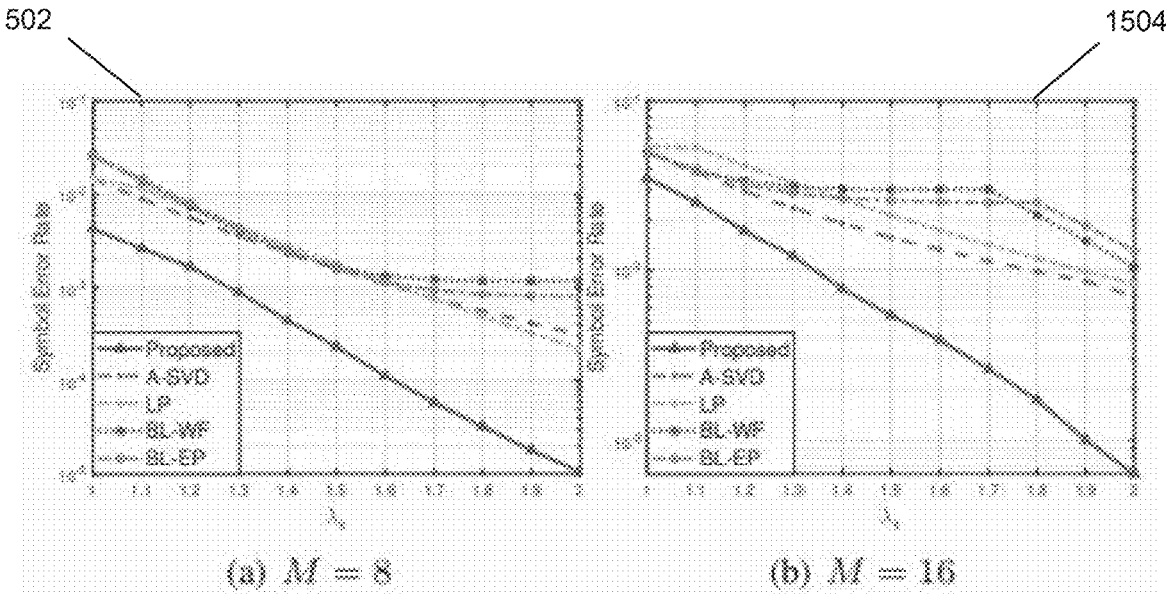
FIGS. 15A and 15B illustrate the influence of different channels on SER by varying the singular values.

FIGS. 15A and 15B illustrate the influence of different channels on SER by varying the singular values. The first singular value of the channel λ1 varies within [1, 2] with an interval of 0.1, while the second singular value λ2 is fixed as 1. The resulting performances for all the methods with SNR=10 dB are illustrated in graphs 1502 and 1504 for M=8 and M=16, respectively. The proposed modulation scheme has the best performance among all considered schemes.

FIG. 1 illustrates a wireless communication system 100 that includes a plurality of base stations 102, each base station 102 having one or more antennae 103. The wireless communication system 100 also includes user devices 110. The user devices 110 may be, for example, cellular phones, smart devices, laptops, computers, servers, gaming consoles, mobile devices, or any other user device that can wirelessly communicate. The base stations 102 and user devices 110 can communicate with each other over one or more networks. As described herein, these networks can include Wi-Fi (e.g., IEEE 802.11 standards), LTE, 5G and 6G cellular networks, and any other suitable networks.

Each of the base stations 103 and user devices 110 may have a transmitter and a receiver. For instance, a base station 103 may transmit a first signal 131 to a user device 103 using its transmitter. The transmitter may generate the first signal 131 based on applying any of the joint constellation and precoding processes described herein to data to be transmitted. The user device 103 may receive the first signal 131 using its receiver. Likewise, a user device 103 may generate and transmit a second signal 133 to a base station 103 using its transmitter. The transmitter may generate the second signal 133 based on applying any of the joint constellation and precoding processes described herein to data to be transmitted. The base station 103 may receive the second signal 133 using its receiver.

For example, FIG. 2 illustrates an exemplary transmitter 202 and receiver 222. Each of the base stations 202 and user devices 110 of FIG. 1 may include corresponding transmitters 202 and receivers 222.

Transmitter 202 can apply any of the joint constellation and precoding modulation methods described herein to digital data 201 to generate a wireless signal for transmission using a plurality of antennae 204. In some examples, transmitter 202 parses the digital data 201 into data groups of a predetermined number of bits, such as four bits. Further, transmitter 202 applies a joint constellation and precoding process to the data groups and, based on the application of the joint constellation and precoding process, generates corresponding transmit symbols. Transmitter 202 also generates a transmission signal based on the transmit symbols, and transmit the transmission signal to each of a first plurality of antenna 204 for wireless transmission. Receiver 222 may receive the transmitted wireless signals from the first plurality of antenna 204 using a second plurality of antennae 214, and may apply a corresponding demodulation process to the received wireless signals to generate receive data 231.

Figure 3:
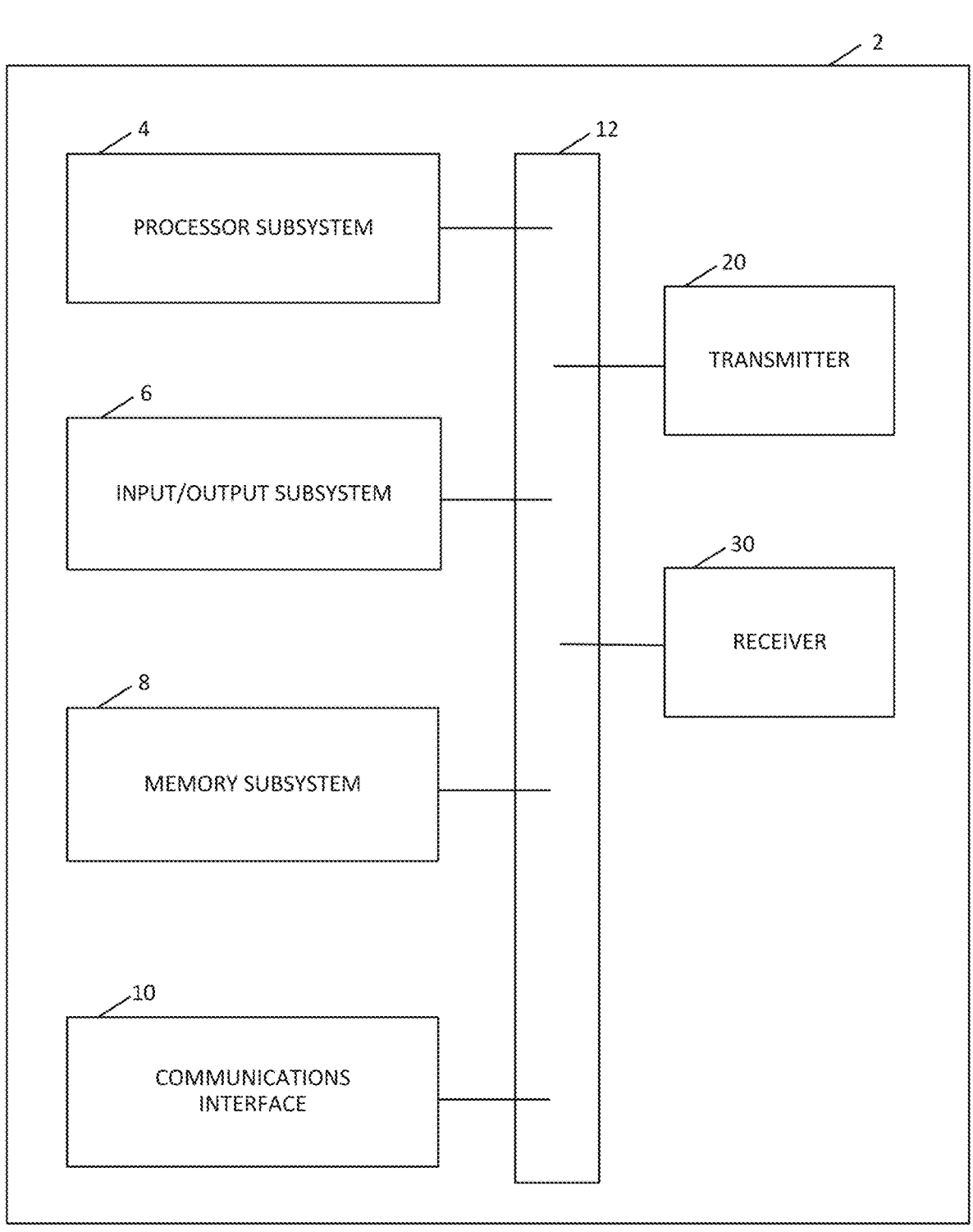
FIG. 3 illustrates a block diagram of a wireless communication device, in accordance with some embodiments.

FIG. 3 illustrates a computer system 2 that may be part of a wireless communication device and configured to implement one or more of the processes (e.g., precoding and modulation processes) described herein, in accordance with some embodiments. The computer system 2 is a representative device and may comprise a processor subsystem 4, an input/output subsystem 6, a memory subsystem 8, a communications interface 10, a transmitter 20, a receiver 30, and a system bus 12. In some embodiments, one or more than one of the system 2 components may be combined or omitted such as, for example, not including an input/output subsystem 6. In some embodiments, the computer system 2 may comprise other components not combined or comprised in those shown in FIG. 3. For example, the system 2 may also include a power subsystem. In other embodiments, the system 2 may include several instances of the components shown in FIG. 3. For example, the system 2 may include multiple memory subsystems 8. For the sake of conciseness and clarity, and not limitation, one of each of the components is shown in FIG. 3.

The processor subsystem 4 may include any processing circuitry operative to control the operations and performance of the system 2. In various aspects, the processor subsystem 4 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also may be implemented by a controller, a microcontroller, an application specific integrated circuit (ASIC), a field programmable gate array (FPGA), a programmable logic device (PLD), and so forth.

In various aspects, the processor subsystem 4 may be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 2 may comprise a system bus 12 that couples various system components including the processing subsystem 4, the input/output subsystem 6, the transmitter 20, the receiver 30, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 6 may include any suitable mechanism or component to enable a user to provide input to system 2 and the system 2 to provide output to the user. For example, the input/output subsystem 6 may include any suitable input mechanism, including but not limited to, a button, keypad, keyboard, click wheel, touch screen, motion sensor, microphone, camera, etc.

In some embodiments, the input/output subsystem 6 may include a visual peripheral output device for providing a display visible to the user. For example, the visual peripheral output device may include a screen such as, for example, a Liquid Crystal Display (LCD) screen. As another example, the visual peripheral output device may include a movable display or projecting system for providing a display of content on a surface remote from the system 2. In some embodiments, the visual peripheral output device can include a coder/decoder, also known as Codecs, to convert digital media data into analog signals. For example, the visual peripheral output device may include video Codecs, audio Codecs, or any other suitable type of Codec.

The visual peripheral output device may include display drivers, circuitry for driving display drivers, or both. The visual peripheral output device may be operative to display content under the direction of the processor subsystem 6. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 may include any suitable hardware, software, or combination of hardware and software that is capable of coupling the system 2 to one or more networks and/or additional devices. The communications interface 10 may be arranged to operate with any suitable technique for controlling information signals using a desired set of communications protocols, services or operating procedures. The communications interface 10 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 may comprise a wireless interface comprising one or more antennas, transmitters, receivers, transceivers, amplifiers, filters, control logic, and so forth.

In various aspects, the communications interface 10 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11 a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods and processes described herein. This computer-readable storage medium can be embodied in, for example, memory subsystem 8.

In some embodiments, the memory subsystem 8 may comprise any machine-readable or computer-readable media capable of storing data, including both volatile/non-volatile memory and removable/non-removable memory. The memory subsystem 8 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the system 2.

In various aspects, the memory subsystem 8 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferro-electric polymer memory), phase-change memory (e.g., ovonic memory), ferroelectric memory, silicon-oxide-ni-tride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 may contain an instruction set, in the form of a file for executing various methods, such as methods including joint constellation and precoding, as described herein. The instruction set may be stored in any acceptable form of machine readable instructions, including source code or various appropriate programming languages. Some examples of programming languages that may be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processing subsystem 4.

Figure 4:
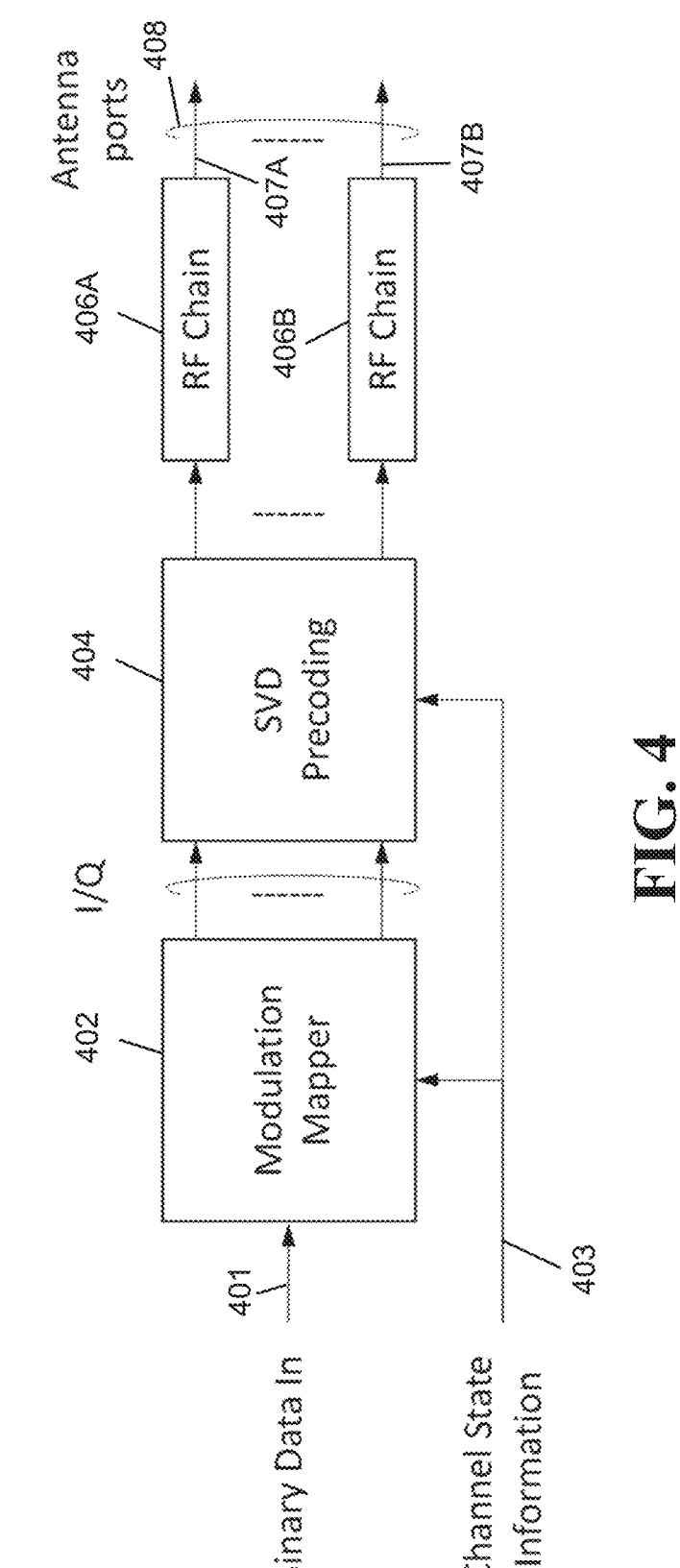
FIG. 4 illustrates a transmitter block diagram, in accordance with some embodiments.

Further, transmitter 20 is operable to receive digital data and apply any of the joint constellation and precoding processes to the digital data to generate symbols for transmission. Further, and based on the generated symbols, transmitter block 20 can generate a wireless signal for transmission. For example, FIG. 4 illustrates an exemplary transmitter 20 that includes a modulation mapper block 402, an SVD precoding block 404, and radio frequency (RF) chains 406A, 406B. Modulation mapper block 402 can perform any of the processes described herein to receive binary data 401 (e.g., digital data) and, optionally, channel state information 403 (e.g., channel properties of a communication link), and apply a joint bit sequence-to-symbol mapping process to the binary data 401 to generate in-phase and quadrature (I/Q) modulation components of a multidimensional joint constellation. SVD precoding block 404 can apply any of the precoding processes described herein to the I/Q modulation components, and provide corresponding coded output data to RF chains 406A, 406B, respectively. The RF chains 406A, 406B may modulate the coded output data to generate corresponding wireless signals 408A, 408B (e.g., I/Q wireless signals). For instance, the modulation may be based on Quadrature Phase Shift Keying (QPSK). The wireless signals 408A, 408B are provided to antenna ports to be transmitted out of corresponding antennae.

Figure 5:
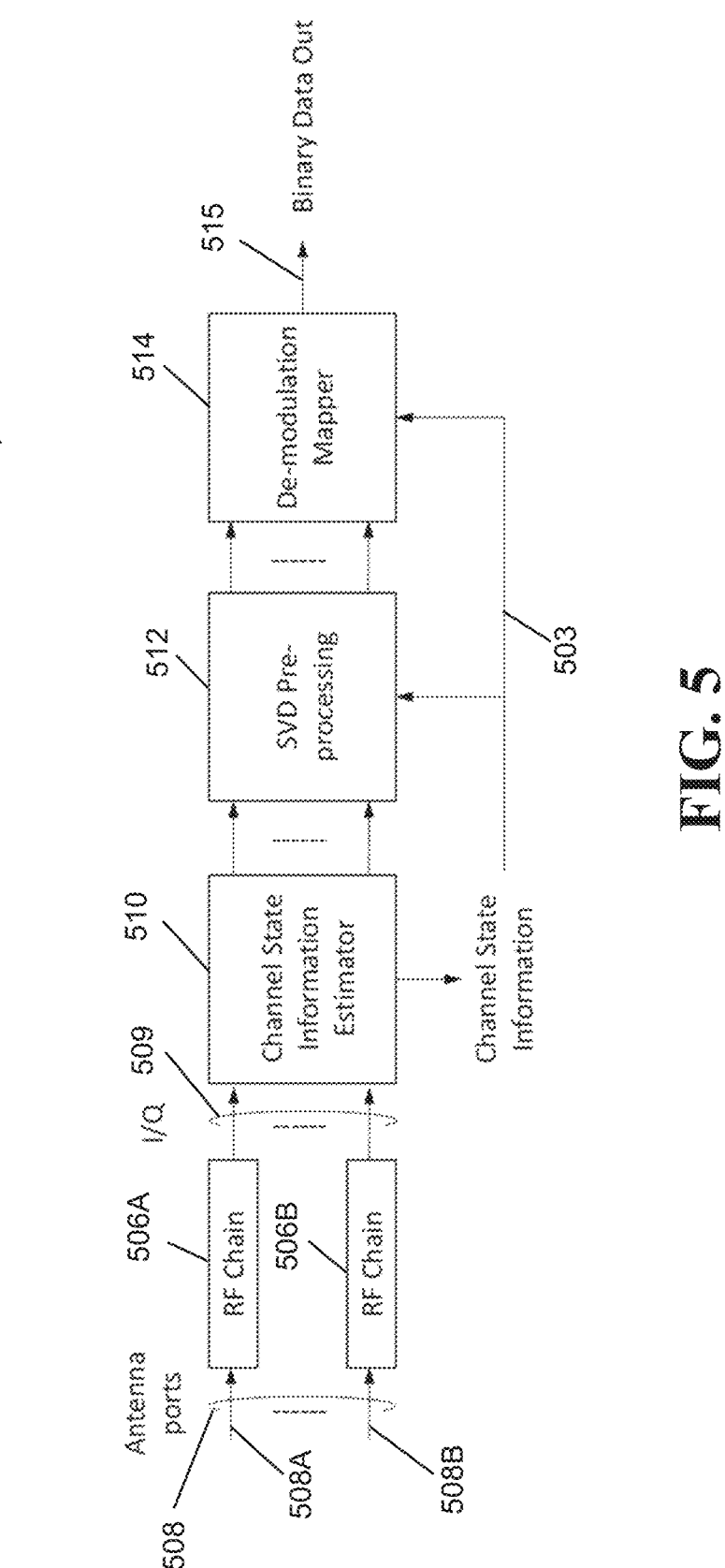
FIG. 5 illustrates a receiver block diagram, in accordance with some embodiments.

Referring back to FIG. 3, receiver 30 is operable to receive a wireless transmission from one or more receive antenna, and apply any of the joint decoding processes described herein to preprocess and demodulate the received wireless transmission. FIG. 5 illustrates an exemplary receiver 30 that includes RF chains 506A, 506B, channel state information estimator block 510, SVD pre-processing block 512, and demodulation mapper block 514. RF chains 506A, 506B may receive corresponding wireless signals 508A, 508B, and based on the wireless signals 508A, 508B, may generate output data 509 characterizing in-phase and quadrature modulation components. Channel state information estimator block 510 may perform operations to generate estimated channel state information 503 based on the output data 509, and may provide the estimated channel state information 503 to the SVD pre-processing block 512 and the demodulation mapper block 514. The SVD pre-processing block 512 may perform operations to determine precoding matrices based on applying SVD to the estimated channel state information 503. Based on the output of the SVD pre-processing block 512, the demodulation mapper block 514 may perform any of the joint demodulation process described herein (e.g., using a joint codebook) to generate binary data 515 (e.g., digital data).

Transmitter 20 and receiver 30 may each be implemented in any suitable hardware, software, or hardware and software combination. For example, all or portions of each of transmitter 20 and receiver 30 may be implemented in one or more FPGAs, ASICs, PLDs, any suitable digital or analog circuitry, or by one or more processors executing corresponding instructions. Furthermore, the disclosed systems and methods for joint constellation and precoding may be implemented in any suitable portion of the transmitter block 20 and/or the receiver block 30. For example, in various embodiments, at least a portion of a joint constellation and precoding process may be implemented by one or more of a modulation mapper component, an SVD precoding block, an SVD pre-processing block, and/or a de-modulation mapper. Although specific embodiment are discussed herein including certain components of a transmitter block 20 and/or a receiver block 30, it will be appreciated that the joint constellation and precoding processes and methods disclosed herein may be implemented by any suitable components of a transmitter block and/or receiver block.

FIG. 16 illustrates an exemplary flowchart of an exemplary process 1600 for generating a wireless transmission. Exemplary process 1600 may be carried out by a transmission device, such as base station 102 or transmitter 20.

Beginning at block 1602, the transmission device receives a data stream. Further, at block 1604, the transmission device parses the data stream to generate groups of a predetermined number of bits. For example, the transmission device may parse the received data stream into groups of four bits. At block 1606, the transmission device maps each group of the predetermined number of data bits to a corresponding symbol and, at block 1608, generates symbols based on the mapping. For instance, and as described herein, the transmission device may generate the symbols based on applying a joint codebook to each of the groups of four bits.

At block 1610, the transmission device separates the symbols based on applying a Mahalanobis distance process to the symbols. As described herein, a symbol error rate is may be minimized by maximizing a Mahalanobis distance between transmit symbols under a total power constraint (e.g., a maximum power constraint). At block 1612, the transmission device transmits the separated symbols using a plurality of antennae (e.g., using antennae 103).

FIG. 17 illustrates an exemplary flowchart of an exemplary process 1700 for transmitting and receiving a wireless transmission. Exemplary process 1700 may be carried out by a transceiver device, such as base station 102 or transmitter 20 and receiver 30.

Beginning at block 1702, the transceiver device receives a data stream. Further, at block 1704, the transceiver device parses the data stream to generate groups of four data bits. At block 1706, the transceiver device maps each group of four data bits to a corresponding symbol, and generates symbols based on the mapping. For instance, and as described herein, the transmission device may generate the symbols based on applying a joint codebook to each of the groups of four bits.

At block 1708, the transceiver device separates the symbols based on applying a Mahalanobis distance process to the symbols. At block 1710, the transceiver device transmits the separated symbols using a plurality of antennae (e.g., using antennae 103).

At block 1712, the separated symbols are received using a second plurality of antennae. For instance, a second base station 103 or second receiver 30 may receive the transmitted, separated symbols. At block 1714, a joint decoding process is applied to the separated symbols to generate receive data. For example, the second base station 103 or second receiver 30 may apply any of the joint demodulating and decoding processes described herein to generate the receive data. At block 1716, the receive data is stored in a data repository, such as a data repository within memory subsystem 8.

The following numbered clauses further describe implementation examples.

1. An apparatus comprising:
   a plurality of antennae;
   a transmitter communicatively coupled to the plurality of antenna, the transmitter configured to:
   receive digital data for transmission;
   parse the digital data into data groups of a predetermined number of bits;
   apply a joint constellation and precoding process to the data groups and, based on the application of the joint constellation and precoding process, generate corresponding transmit symbols;
   generate a transmission signal based on the transmit symbols; and
   transmit the transmission signal to each of the plurality of antennae for wireless transmission.
2. The apparatus of clause 1, wherein the transmitter is configured to generate the transmit symbols based on a joint codebook.
3. The apparatus of clause 2, wherein the joint codebook includes a number of symbol vectors defining a joint constellation, wherein the number of symbol vectors is based on a corresponding modulation order.
4. The apparatus of clause 3, wherein the number of symbol vectors are based on a channel gain for each of the plurality of antennae.
5. The apparatus of any of clauses 1-4, wherein the transmitter is configured to:
   apply a Mahalanobis distance (MD) process to the transmit symbols to generate rearranged transmit symbols; and
   generate the transmission signal based on the rearranged transmit symbols.
6. The apparatus of any of clauses 1-5, wherein the joint codebook is based on a constellation design for the plurality of antennae.
7. The apparatus of any of clauses 1-6, wherein the transmitter is configured to linearly scale the transmit symbols.
8. The apparatus of any of clauses 1-7, wherein the predetermined number of bits is four.
9. The apparatus of any of clauses 1-8, wherein the transmit symbols are based on Quadrature Phase Shift Keying (QPSK).
10. The apparatus of any of clauses 1-9, wherein the plurality of antennae comprise a first antenna and a second antenna in a multi-input multi-output (MIMO) configuration.

11. A computer-implemented method by at least one processor, the method comprising:
   receiving digital data for transmission;
   parsing the digital data into data groups of a predetermined number of bits;
   applying a joint constellation and precoding process to the data groups and, based on the application of the joint constellation and precoding process, generating corresponding transmit symbols;
   generating a transmission signal based on the transmit symbols; and
   transmitting the transmission signal to each of a plurality of antennae for wireless transmission.
12. The method of clause 11, comprising generating the transmit symbols based on a joint codebook.
13. The method of clause 12, wherein the joint codebook includes a number of symbol vectors defining a joint constellation, wherein the number of symbol vectors is based on a corresponding modulation order.
14. The method of clause 13, wherein the number of symbol vectors are based on a channel gain for each of the plurality of antennae.
15. The method of any of clauses 11-14, comprising:
   applying a Mahalanobis distance (MD) process to the transmit symbols to generate rearranged transmit symbols; and
   generating the transmission signal based on the rearranged transmit symbols.
16. The method of any of clauses 11-15, wherein the joint codebook is based on a constellation design for the plurality of antennae.
17. The method of any of clauses 11-16, comprising linearly scaling the transmit symbols.
18. The method of any of clauses 11-17, wherein the predetermined number of bits is four.
19. The method of any of clauses 11-18, wherein the transmit symbols are based on Quadrature Phase Shift Keying (QPSK).
20. The method of any of clauses 11-19, wherein the plurality of antennae comprise a first antenna and a second antenna in a multi-input multi-output (MIMO) configuration.
21. A tangible, non-transitory, computer-readable medium storing instructions that, when executed by at least one processor, cause the at least one processor to:
   receive digital data for transmission;
   parse the digital data into data groups of a predetermined number of bits;
   apply a joint constellation and precoding process to the data groups and, based on the application of the joint constellation and precoding process, generating corresponding transmit symbols;
   generate a transmission signal based on the transmit symbols; and
   transmit the transmission signal to each of a plurality of antennae for wireless transmission.
21. The tangible, non-transitory, computer-readable medium of clause 20, wherein the instructions, when executed by the at least one processor, cause the at least one processor to generate the transmit symbols based on a joint codebook.
22. The tangible, non-transitory, computer-readable medium of clause 21, wherein the joint codebook includes a number of symbol vectors defining a joint constellation, wherein the number of symbol vectors is based on a corresponding modulation order.
23. The tangible, non-transitory, computer-readable medium of clause 22, wherein the joint codebook includes a number of symbol vectors defining a joint constellation, wherein the number of symbol vectors is based on a corresponding modulation order.

24. The tangible, non-transitory, computer-readable medium of clause 23, wherein the number of symbol vectors are based on a channel gain for each of the plurality of antennae.

25. The tangible, non-transitory, computer-readable medium of any of clauses 21-24, wherein the instructions, when executed by the at least one processor, cause the at least one processor to:
apply a Mahalanobis distance (MD) process to the transmit symbols to generate rearranged transmit symbols; and
generate the transmission signal based on the rearranged transmit symbols.

26. The tangible, non-transitory, computer-readable medium of any of clauses 21-25, wherein the joint codebook is based on a constellation design for the plurality of antennae.

27. The tangible, non-transitory, computer-readable medium of any of clauses 21-26, wherein the instructions, when executed by the at least one processor, cause the at least one processor to linearly scale the transmit symbols.

28. The tangible, non-transitory, computer-readable medium of any of clauses 21-27, wherein the predetermined number of bits is four.

29. The tangible, non-transitory, computer-readable medium of any of clauses 21-28, wherein the transmit symbols are based on Quadrature Phase Shift Keying (QPSK).

30. The tangible, non-transitory, computer-readable medium of any of clauses 21-29, wherein the plurality of antennae comprise a first antenna and a second antenna in a multi-input multi-output (MIMO) configuration.

Although the subject matter has been described in terms of exemplary embodiments, it is not limited thereto. Rather, the appended claims should be construed broadly, to include other variants and embodiments, which may be made by those skilled in the art.

What is claimed is:
1. An apparatus comprising:
a plurality of antennas;
a transmitter communicatively coupled to the plurality of antennas, the transmitter configured to:
receive digital data for transmission;
parse the digital data into data groups of a predetermined number of bits;
apply a joint constellation and precoding process to the data groups and, based on the application of the joint constellation and precoding process, generate corresponding transmit symbols based on a joint codebook;
generate a transmission signal based on the transmit symbols; and
transmit the transmission signal to each of the plurality of antennas for wireless transmission.

2. The apparatus of claim 1, wherein the joint codebook includes a number of symbol vectors defining a joint constellation, wherein the number of symbol vectors is based on a corresponding modulation order.

3. The apparatus of claim 2, wherein the number of symbol vectors are based on a channel gain for each of the plurality of antennas.

4. The apparatus of claim 1, wherein the transmitter is configured to:
apply a Mahalanobis distance (MD) process to the transmit symbols to generate rearranged transmit symbols; and
generate the transmission signal based on the rearranged transmit symbols.

5. The apparatus of claim 1, wherein the joint codebook is based on a constellation design for the plurality of antennas.

6. The apparatus of claim 1, wherein the transmitter is configured to linearly scale the transmit symbols.

7. The apparatus of claim 1, wherein the predetermined number of bits is four.

8. The apparatus of claim 1, wherein the transmit symbols are based on Quadrature Phase Shift Keying (QPSK).

9. The apparatus of claim 1, wherein the plurality of antennas comprise a first antenna and a second antenna in a multi-input multi-output (MIMO) configuration.

10. A computer-implemented method by at least one processor, the method comprising:
receiving digital data for transmission;
parsing the digital data into data groups of a predetermined number of bits;
applying a joint constellation and precoding process to the data groups and, based on the application of the joint constellation and precoding process, generating corresponding transmit symbols based on a joint codebook;
generating a transmission signal based on the transmit symbols; and
transmitting the transmission signal to each of a plurality of antennas for wireless transmission.

11. The method of claim 10, wherein the joint codebook includes a number of symbol vectors defining a joint constellation, wherein the number of symbol vectors is based on a corresponding modulation order.

12. The method of claim 10, comprising:
applying a Mahalanobis distance (MD) process to the transmit symbols to generate rearranged transmit symbols; and
generating the transmission signal based on the rearranged transmit symbols.

13. The method of claim 10, comprising linearly scaling the transmit symbols.

14. A tangible, non-transitory, computer-readable medium storing instructions that, when executed by at least one processor, cause the at least one processor to:
receive digital data for transmission;
parse the digital data into data groups of a predetermined number of bits;
apply a joint constellation and precoding process to the data groups and, based on the application of the joint constellation and precoding process, generating corresponding transmit symbols based on a joint codebook;
generate a transmission signal based on the transmit symbols; and
transmit the transmission signal to each of a plurality of antennas for wireless transmission.

15. The tangible, non-transitory, computer-readable medium of claim 14, wherein the joint codebook includes a number of symbol vectors defining a joint constellation, wherein the number of symbol vectors is based on a corresponding modulation order.

16. The tangible, non-transitory, computer-readable medium of claim 14, wherein the instructions, when executed by the at least one processor, cause the at least one processor to:

apply a Mahalanobis distance (MD) process to the transmit symbols to generate rearranged transmit symbols; and generate the transmission signal based on the rearranged transmit symbols.

17. The tangible, non-transitory, computer-readable medium of claim 14, wherein the instructions, when executed by the at least one processor, cause the at least one processor to linearly scale the transmit symbols.

18. An apparatus comprising:

a plurality of antennas;

a transmitter communicatively coupled to the plurality of antennas, the transmitter configured to:

receive digital data for transmission;

parse the digital data into data groups of a predetermined number of bits;

apply a joint constellation and precoding process to the data groups and, based on the application of the joint constellation and precoding process, generate corresponding transmit symbols;

apply a Mahalanobis distance (MD) process to the transmit symbols to generate rearranged transmit symbols;

generate a transmission signal based on the rearranged transmit symbols; and transmit the transmission signal to each of the plurality of antennas for wireless transmission.

19. An apparatus comprising:

a plurality of antennas;

a transmitter communicatively coupled to the plurality of antenna, the transmitter configured to:

receive digital data for transmission;

parse the digital data into data groups of a predetermined number of bits, wherein the predetermined number of bits is four;

apply a joint constellation and precoding process to the data groups and, based on the application of the joint constellation and precoding process, generate corresponding transmit symbols;

generate a transmission signal based on the transmit symbols; and transmit the transmission signal to each of the plurality of antennas for wireless transmission.

20. A tangible, non-transitory, computer-readable medium storing instructions that, when executed by at least one processor, cause the at least one processor to:

receive digital data for transmission;

parse the digital data into data groups of a predetermined number of bits;

apply a joint constellation and precoding process to the data groups and, based on the application of the joint constellation and precoding process, generating corresponding transmit symbols;

apply a Mahalanobis distance (MD) process to the transmit symbols to generate rearranged transmit symbols;

generate a transmission signal based on the rearranged transmit symbols; and transmit the transmission signal to each of a plurality of antennas for wireless transmission.

* * * * *